(12) United States Patent  
Park et al.

(10) Patent No.: US 12,124,696 B2
(45) Date of Patent: Oct. 22, 2024

(54) ELECTRONIC DEVICE AND METHOD TO PROVIDE STICKER BASED ON CONTENT INPUT

(71) Applicant: Samsung Electronics Co., Ltd., Gyeonggi-do (KR)

(72) Inventors: Chunbae Park, Gyeonggi-do (KR); Dami Jeon, Gyeonggi-do (KR); Sangheon Kim, Gyeonggi-do (KR); Jinhyung Yoo, Gyeonggi-do (KR); Yeunwook Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/830,664

(22) Filed: Jun. 2, 2022

(65) Prior Publication Data

US 2022/0326846 A1    Oct. 13, 2022

Related U.S. Application Data

(63) Continuation-in-part of application No. PCT/KR2022/004555, filed on Mar. 31, 2022.

(30) Foreign Application Priority Data

Apr. 1, 2021 (KR) .......................... 10-2021-0042637

(51) Int. Cl.
| | |
|---|---|
| *G06F 3/048* | (2013.01) |
| *G06F 3/0481* | (2022.01) |
| *G06F 3/04842* | (2022.01) |
| *G06F 3/04886* | (2022.01) |
| *G06T 11/00* | (2006.01) |

(52) U.S. Cl.
CPC ........ *G06F 3/04886* (2013.01); *G06F 3/0481* (2013.01); *G06F 3/04842* (2013.01); *G06T 11/00* (2013.01)

(58) Field of Classification Search
CPC .............. G06F 3/04886; G06F 3/0481; G06F 3/04842; G06T 11/00
See application file for complete search history.

(56) References Cited

U.S. PATENT DOCUMENTS

| 7,185,285 B2 | 2/2007 | Van Dok et al. |
| 9,542,038 B2 * | 1/2017 | van Os .................. G06F 9/451 |
| 10,269,164 B1 | 4/2019 | Song et al. |

(Continued)

FOREIGN PATENT DOCUMENTS

| KR | 10-2016-0031619 A | 3/2016 |
| KR | 10-2017-0074373 A | 6/2017 |

(Continued)

OTHER PUBLICATIONS

Extended European Search Report dated Jul. 9, 2024.

*Primary Examiner* — David Phantana-angkool
(74) *Attorney, Agent, or Firm* — Cha & Reiter, LLC

(57) ABSTRACT

According to certain embodiments, a method comprises: generating a sticker from first content in a first application; mapping second content to the generated sticker, thereby resulting in a mapped sticker; and in response to receiving text input to a second application from a virtual keyboard, the text input having a meaning related to the second content, providing the mapped sticker to the second application.

20 Claims, 21 Drawing Sheets

(56) References Cited

U.S. PATENT DOCUMENTS

| | | |
|---|---|---|
| 10,521,091 B2 | 12/2019 | Anzures et al. |
| 10,540,018 B2 | 1/2020 | Yang et al. |
| 10,659,405 B1* | 5/2020 | Chang ................. G06F 3/04817 |
| 10,810,211 B2* | 10/2020 | Liu ......................... H04L 51/04 |
| 11,704,008 B2* | 7/2023 | Dalonzo ................. G06F 3/165 |
| | | 715/716 |
| 11,960,562 B1* | 4/2024 | Paul ....................... G06Q 50/01 |
| 2015/0172246 A1 | 6/2015 | Velummylum et al. |
| 2016/0055370 A1 | 2/2016 | Garcia |
| 2017/0193280 A1* | 7/2017 | Huang .................. G06F 16/784 |
| 2018/0137660 A1 | 5/2018 | De Abreu Rodriguez et al. |
| 2018/0314409 A1 | 11/2018 | Adilipour et al. |
| 2018/0329960 A1* | 11/2018 | Liu ....................... G06Q 10/107 |
| 2020/0026755 A1* | 1/2020 | Hewitt .................... G06F 40/30 |
| 2020/0134031 A1* | 4/2020 | Wallis .................... G06Q 50/01 |
| 2020/0233574 A1* | 7/2020 | Okafor ................... H04L 51/52 |
| 2020/0393915 A1* | 12/2020 | Brendel ............ G06F 18/23213 |
| 2020/0402304 A1 | 12/2020 | Hwang et al. |
| 2021/0034666 A1* | 2/2021 | Detroja ................. G06F 16/685 |
| 2021/0056760 A1* | 2/2021 | Cowburn ............... G06T 19/006 |
| 2021/0089623 A1* | 3/2021 | Guidotti .................. G06F 40/30 |
| 2021/0099405 A1* | 4/2021 | Al Majid ................ H04L 51/10 |
| 2021/0165559 A1* | 6/2021 | Voss ......................... G06T 13/80 |
| 2021/0299581 A1* | 9/2021 | Wu ......................... A63F 13/48 |
| 2021/0304451 A1* | 9/2021 | Fortier .................... G10L 15/08 |
| 2021/0304469 A1* | 9/2021 | Heikkinen .......... G06F 3/04845 |
| 2021/0342060 A1* | 11/2021 | Dalonzo ................. G11B 27/00 |
| 2022/0092071 A1* | 3/2022 | McIntosh .............. G06F 16/532 |
| 2022/0134236 A1* | 5/2022 | Blackstock ............. A63F 13/35 |
| | | 463/31 |
| 2022/0179665 A1* | 6/2022 | Rathod ................... G06F 9/451 |
| 2023/0006952 A1* | 1/2023 | Li ......................... G06F 3/0484 |
| 2023/0066583 A1* | 3/2023 | Li ........................... H04L 51/10 |
| 2023/0082074 A1* | 3/2023 | Ko ....................... G06F 3/04817 |
| | | 345/473 |
| 2023/0136013 A1* | 5/2023 | Goodrich ................ H04L 51/10 |
| | | 345/419 |
| 2023/0138677 A1* | 5/2023 | Kwong ................. G06T 11/203 |
| | | 345/473 |
| 2023/0298629 A1* | 9/2023 | Guggenberger ........ G06T 11/00 |
| | | 386/282 |
| 2024/0062008 A1* | 2/2024 | Ghosh ................... G06F 40/289 |
| 2024/0176470 A1* | 5/2024 | Boyd ..................... H04L 51/52 |

FOREIGN PATENT DOCUMENTS

| | | |
|---|---|---|
| KR | 10-2019-0059624 A | 5/2019 |
| KR | 10-2112584 B1 | 5/2020 |
| WO | 2019/143227 A1 | 7/2019 |

\* cited by examiner

ELECTRONIC DEVICE AND METHOD TO PROVIDE STICKER BASED ON CONTENT INPUT

CROSS-REFERENCE TO RELATED APPLICATIONS

This application is a Continuation of International Application No. PCT/KR2022/004555 designating the United States, filed on Mar. 31, 2022, in the Korean Intellectual Property Receiving Office and claiming priority to Korean Patent Application No. 10-2021-0042637, filed on Apr. 1, 2021, in the Korean Intellectual Property Office, the disclosures of which are incorporated by reference herein in their entireties.

BACKGROUND

1. Field

The disclosure relates to a technology of providing a sticker based on a content input.

2. Description of Related Art

Content expressing emotions using a specific person (e.g., a celebrity) is desirable. However, unless the content is pre-existing, it is difficult to use the specific person for expressing emotions.

Also, it is difficult to generate content for expressing emotions using a photograph captured by a user or a downloaded image file, or to share the generated content through a keyboard application.

SUMMARY

According to certain embodiments, an electronic device comprises: a display; a processor electrically connected to the display; and a memory electrically connected to the processor, wherein the processor is configured to perform a plurality of operations, the plurality of operations comprising: generating a sticker from first content in a first application; mapping second content to the sticker, thereby resulting in a mapped sticker; and in response to receiving text input to a second application from a virtual keyboard, the text input having a meaning related to the second content, providing the mapped sticker to the second application. According to certain embodiments, a method comprises: generating a sticker from first content in a first application; mapping second content to the generated sticker, thereby resulting in a mapped sticker; and in response to receiving text input to a second application from a virtual keyboard, the text input having a meaning related to the second content, providing the mapped sticker to the second application.

According to an example embodiment, an electronic device may enhance a user experience associated with a sticker.

According to an example embodiment, an electronic device may provide improved sticker-related experiences to all users who use the electronic device.

According to an example embodiment, an electronic device may provide a more personalized sticker-related experience by providing a function of generating and using a sticker in an application of the electronic device.

According to an example embodiment, an electronic device may transmit and share a sticker generated by a user through a keyboard application, to expand sharing of emotions between users through personalized stickers.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

An electronic device according to an example embodiment may provide improved sticker-related experiences to all users who use the electronic device, may provide a function of generating a sticker package including a custom sticker to a user, and may transmit and share a sticker generated by a user through a keyboard application.

Figure 1:
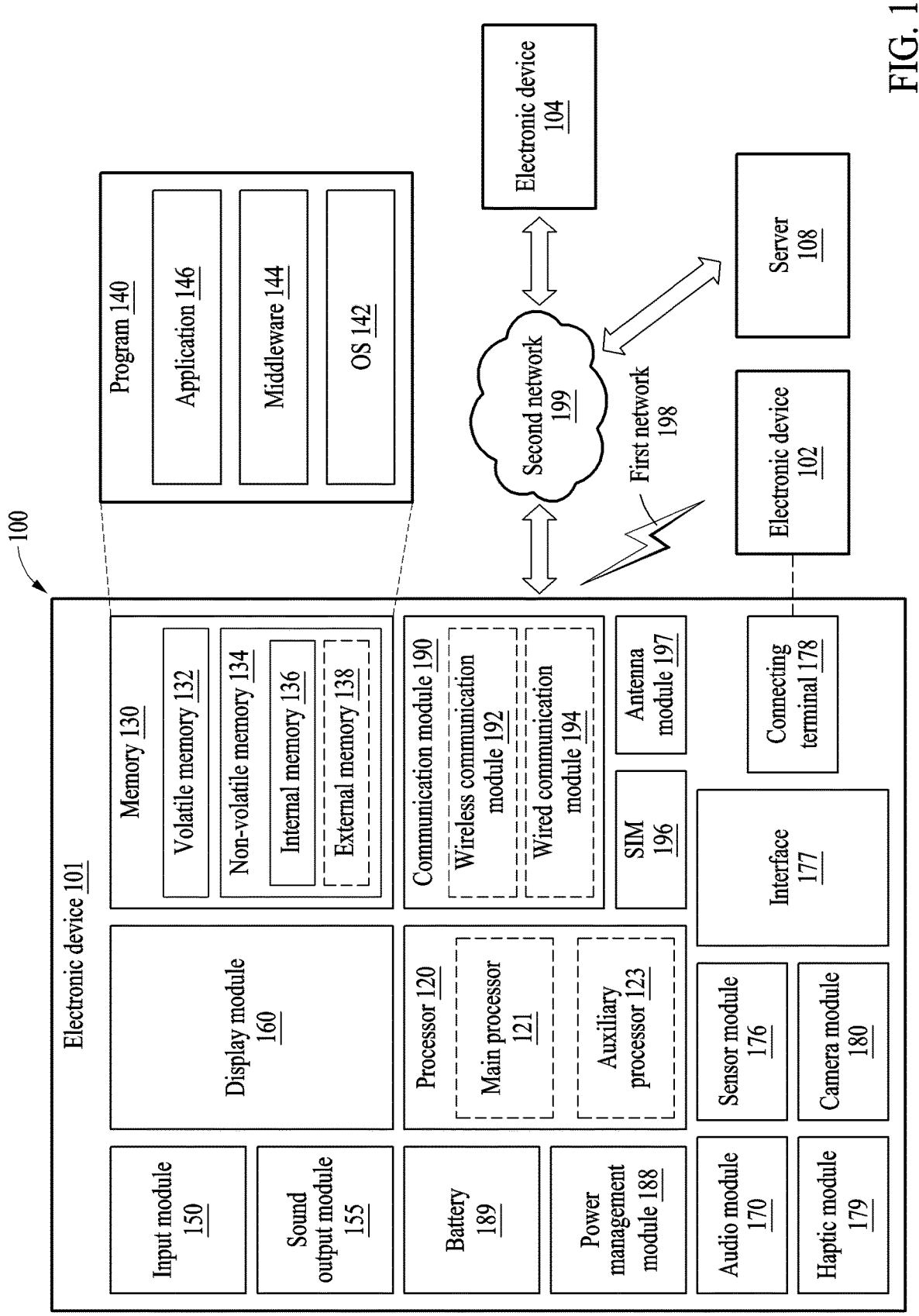
FIG. 1 is a block diagram illustrating an electronic device in a network environment according to certain embodiments.

Hereinafter, example embodiments will be described in detail with reference to the accompanying drawings. When describing the example embodiments with reference to the accompanying drawings, like reference numerals refer to like elements and a repeated description related thereto will be omitted. FIG. 1 describes an electronic device, while FIG. 2 describes programs that are executed on the electronic device.

Electronic Device

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160). The term "processor" shall be understood to refer to both the singular and plural contexts.

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to detect a touch, or a pressure sensor adapted to measure the intensity of force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to certain embodiments, the antenna module 197 may form a mmWave antenna module. According to an example embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
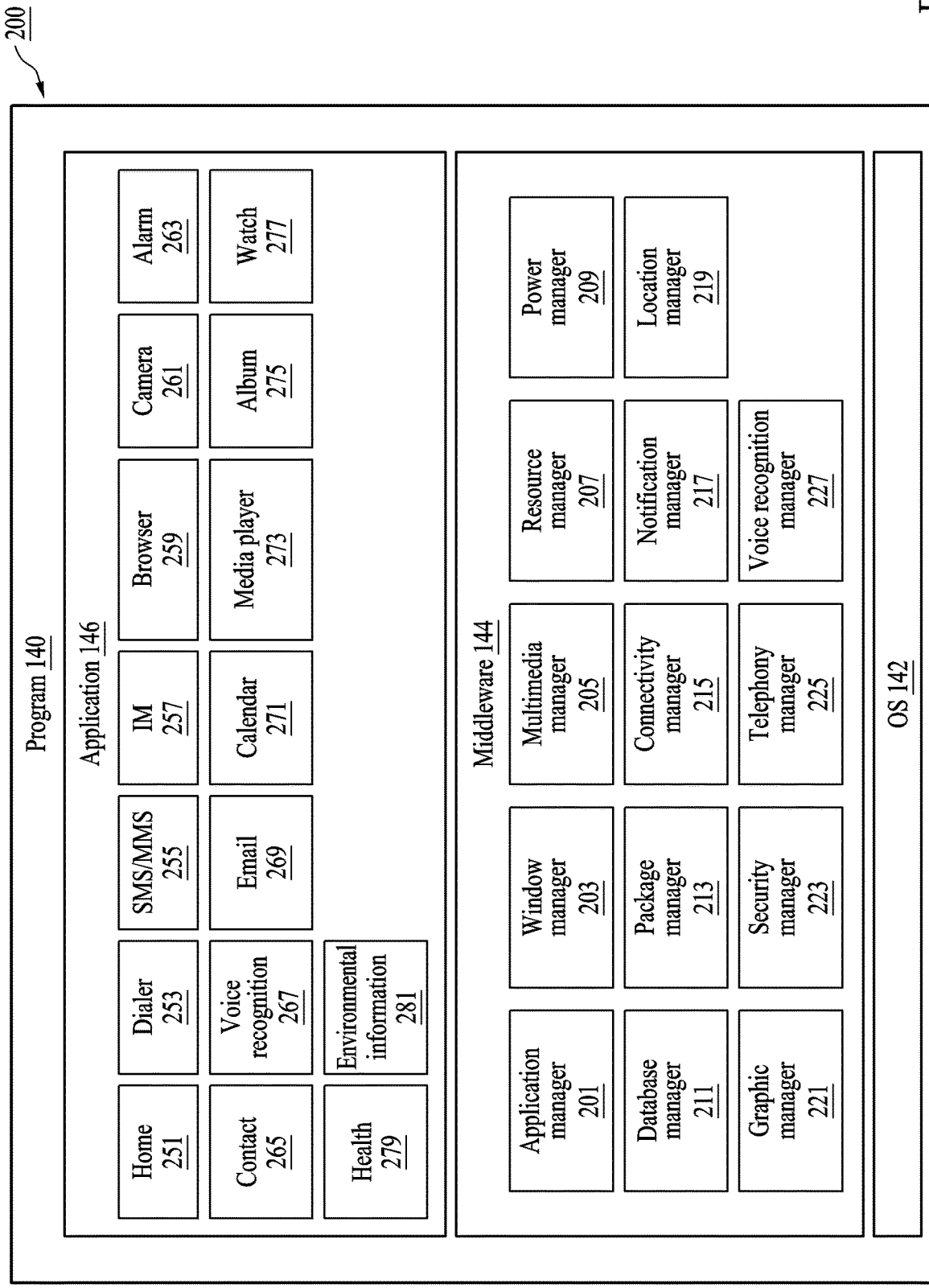
FIG. 2 is a block diagram illustrating a program according to certain embodiments.

FIG. 2 is a block diagram 200 illustrating a program 140 according to certain embodiments. According to an example embodiment, the program 140 may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be preloaded on the electronic device 101 during manufacture, or may be downloaded from or updated by an external electronic device (e.g., the electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include other one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. If a change in a state of an electronic device is identified through a sensor module (e.g., the sensor module 176 of FIG. 1), the window manager 203 may transmit information of a display area corresponding to the changed state of the electronic device to the application 146. For example, if the change in the state of the electronic device is identified, the information of the display area corresponding to the changed state of the electronic device may be transmitted to an application to which continuity is set among applications that are being executed. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an example embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects. The graphic manager 221 may draw at least one layer based on a resolution of a second display area of a display. In an example embodiment, the application 146 may draw at least one layer based on a resolution of a display area of a display module, using the graphic manager 221. The security manager 223, for example, may provide system security or user authentication. The telephony manager 225, for example, may manage a voice call function or a video call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based on at least in part on the voice data. According to an example embodiment, the middleware 144 may dynamically delete some existing components or add new components. According to an example embodiment, at least part of the middleware 144 may be included as part of the OS 142 or may be implemented as another software separate from the OS 142.

The application 146 may draw at least one layer based on a resolution of a display area of a display module (e.g., the display module 160 of FIG. 1). In an example embodiment, the application 146 may draw at least one layer based on a resolution of a display area of a display, using a drawing library (e.g., a view). The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an example embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101. Hereinafter, a first application for generating a sticker, a keyboard application for obtaining an input from a user, and a second application (e.g., a messenger application and a social network service (SNS) application) for utilizing a generated sticker will be described. The keyboard application may be installed with a database related to stickers generated in the first application, or may access a sticker database. The keyboard application may provide a sticker to the second application based on a user input. A plug-in for providing a sticker installed on a sticker center may be installed in the keyboard application.

The device management application may control a power source (e.g., turning on or off) or a function (e.g., brightness, resolution, or focus) of an external electronic device that communicates with the electronic device 101 or a portion of components of the external electronic device (e.g., a display module or a camera module). The device management application may additionally or alternatively support installation, deletion, or update of an application that operates in an external electronic device.

The electronic device according to certain embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that certain embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Certain embodiments as set forth herein may be implemented as software (e.g., the program 140) including one or more instructions that are stored in a storage medium (e.g., the internal memory 136 or the external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 3:
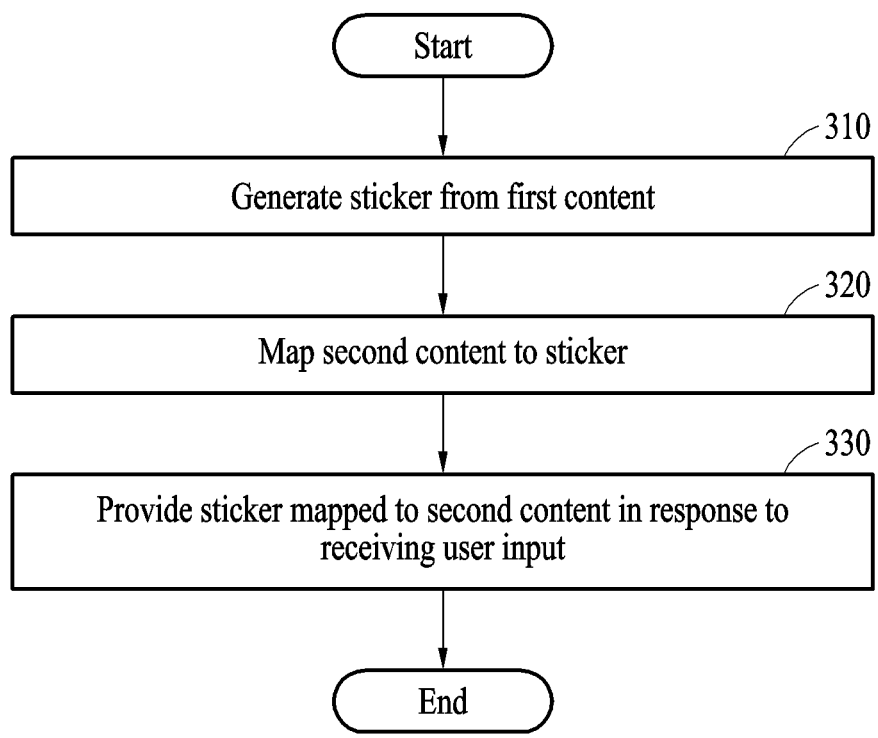
FIG. 3 is a flowchart illustrating an example of an operating method of an electronic device.

FIG. 3 is a flowchart illustrating an example of an operating method of an electronic device.

In operation 310, an electronic device (e.g., the electronic device 101 of FIG. 1) may generate a sticker from first content. The electronic device may generate a sticker from the first content. The first content may be selected in response to a user input in a first application. The first application may be an application for generating a sticker. The first application may access first content of an internal server of an electronic device and/or an external server (e.g., the server 108 of FIG. 1). The first content may include, for example, an emoji and an image (e.g., a still image and video). A user may select the content with an input from among content stored in an internal memory/external server (e.g., the memory 130 of FIG. 1) through the first application. The electronic device may generate a sticker from loaded first content, which will be described below with reference to FIGS. 4 to 6A.

In operation 320, the electronic device may map second content to the sticker. The second content may be content mapped to a sticker and used for predictive text. That is, when the user inputs text resulting in a predictive word that has a meaning related to the second content, the sticker can be provided as prediction candidate. The second content may include, for example, any one or any combination of a character string, an emoticon, an emoji, a voice, a tag (for example, a hashtag), a uniform resource locator (URL), and augmented reality (AR) information (e.g., an AR emoji and an AR avatar). For reference, a tag assigned as metadata may be referred to as a "metadata tag." The hashtag may be a tag with a keyword including a hash symbol. However, a delimiter of the tag is not limited to the hash symbol, and other symbols such as an at-sign, @, may also be used. The electronic device may determine the second content to be mapped to the electronic device based on a user input, or may automatically determine the second content based on a result obtained by analyzing the first content. Examples of mapping the sticker and the second content will be described below with reference to FIGS. 10 to 13.

In operation 330, the electronic device may provide the sticker mapped to the second content (mapped sticker) in response to receiving a user input. In response to receiving text input to a virtual keyboard with a meaning related to the second content, the electronic device may provide the mapped sticker to a second application. Providing the mapped sticker to the second application can include displaying the mapped sticker in the virtual keyboard, while the virtual keyboard provides inputs to the second application, regardless of whether the user actually selects the sticker. In an example, the electronic device may retrieve prediction content by predicting an intent of a user from a user input (e.g., a character string and an emoji input), and recommend the mapped sticker to a prediction area when the retrieved prediction content has a meaning that is related to the second content. The prediction content may be content that is predicted to be intended by a user from content (e.g., a character string, an emoji, a link address, and an image) entered by the user. In response to an input to select the mapped sticker from the prediction area of the virtual keyboard, the electronic device may input the selected sticker to the second application. In another example, when prediction content retrieved based on a user input includes the second content, the electronic device may automatically mapped sticker to the second application.

The electronic device may generate a sticker using an image captured by a user and/or an image received from outside (e.g., a website or another electronic device) of the electronic device. The electronic device may share the generated sticker with another application (e.g., a messenger application, and an SNS application) through the keyboard application.

Figure 4:
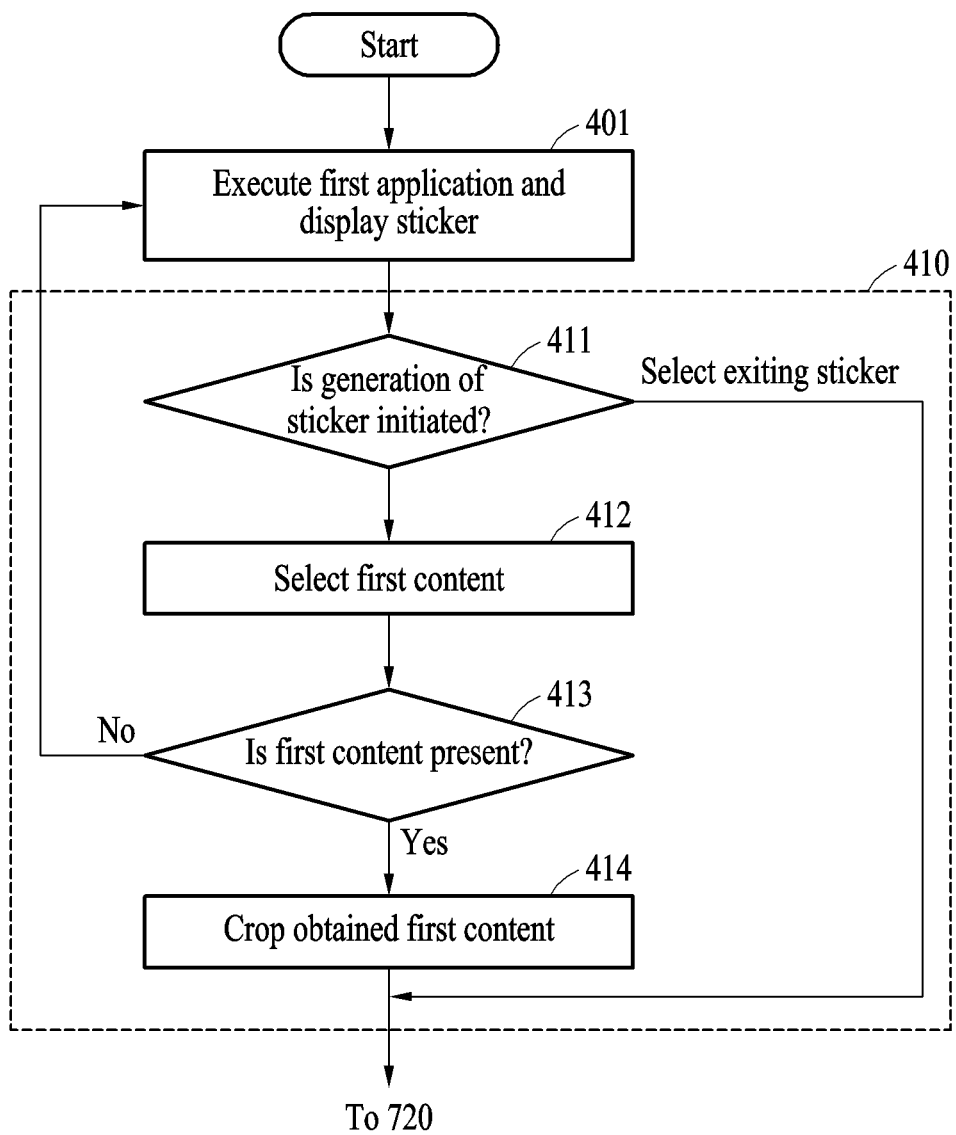
FIG. 4 is a flowchart illustrating an operation of generating a sticker according to certain embodiments.

FIG. 4 is a flowchart illustrating an operation of generating a sticker according to certain embodiments.

In operation 401, an electronic device (e.g., the electronic device 101 of FIG. 1) may execute a first application and display a sticker. The first application may access an internal memory space and/or an external server that stores first content and provide a user with a tool capable of generating a sticker from the first content. For example, as shown in FIG. 5 below, the electronic device may display a list of pre-generated stickers when the first application is executed.

In operation 410, the electronic device may generate a sticker in response to a user input. For example, in operation 411, the electronic device may determine whether to initiate a generation of a sticker. In operation 412, the electronic device may select first content in response to a user input. For example, the electronic device may provide content accessible by the first application to a user and receive a selection of at least one first content from the user. In operation 413, the electronic device may determine whether the first content is present. If the first content selected by the user is determined to be absent, the electronic device may reperform operation 401. If the first content selected by the user is determined to be present, the electronic device may provide a function of cropping the obtained first content in operation 414. In addition, if it is determined that the generation of the sticker is not initiated in operation 411, the electronic device may select a pre-generated sticker.

An example of displaying a sticker package when the first application is executed will be described below with reference to FIG. 5, and an example of generating a sticker in the first application will be described below with reference to FIG. 6. For reference, in the present specification, a sticker package may be a set of one or more stickers.

Figure 5:
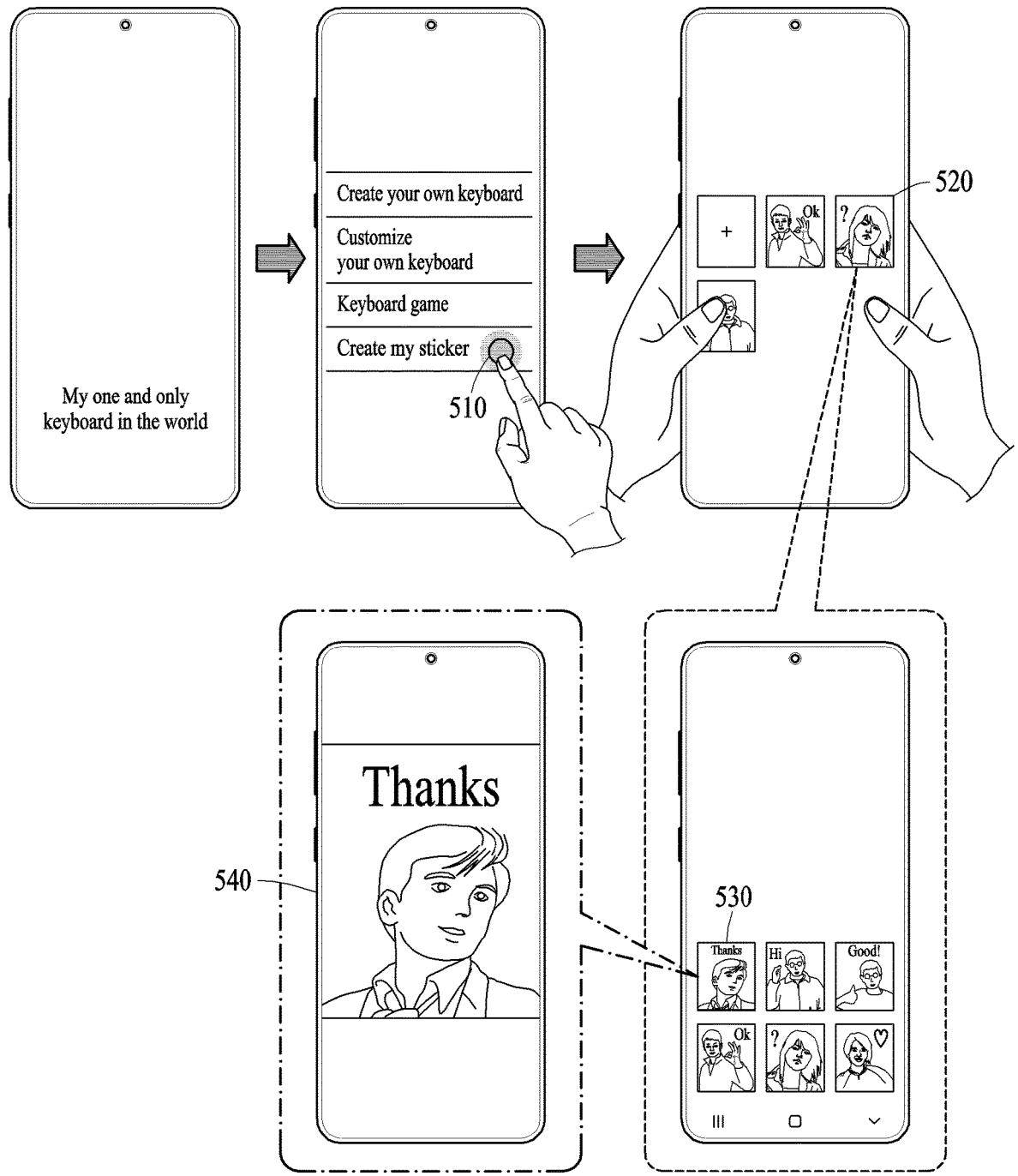
FIG. 5 is a diagram illustrating an example of displaying a pre-generated sticker package according to certain embodiments.

FIG. 5 is a diagram illustrating an example of displaying a pre-generated sticker package according to certain embodiments.

According to an example embodiment, an electronic device (e.g., the electronic device 101 of FIG. 1) may execute a first application and may enter a screen associated with a sticker in response to a user input 510 in the first application. The electronic device may provide a pre-generated sticker package list. However, there is no limitation thereto, and the electronic device may also output an empty space. The first application may be or be part of an application for configuring a keyboard of the electronic device.

For example, the electronic device may provide stickers included in a pre-generated sticker package 520 in response to an input to select the pre-generated sticker package 520.

The electronic device may provide thumbnails corresponding to the stickers included in the pre-generated sticker package 520. In response to an input to select a thumbnail 530, the electronic device may output a sticker 540 with the thumbnail 530.

An example of generating a sticker and a sticker package will be described below with reference to FIG. 6A.

Figure 6A:
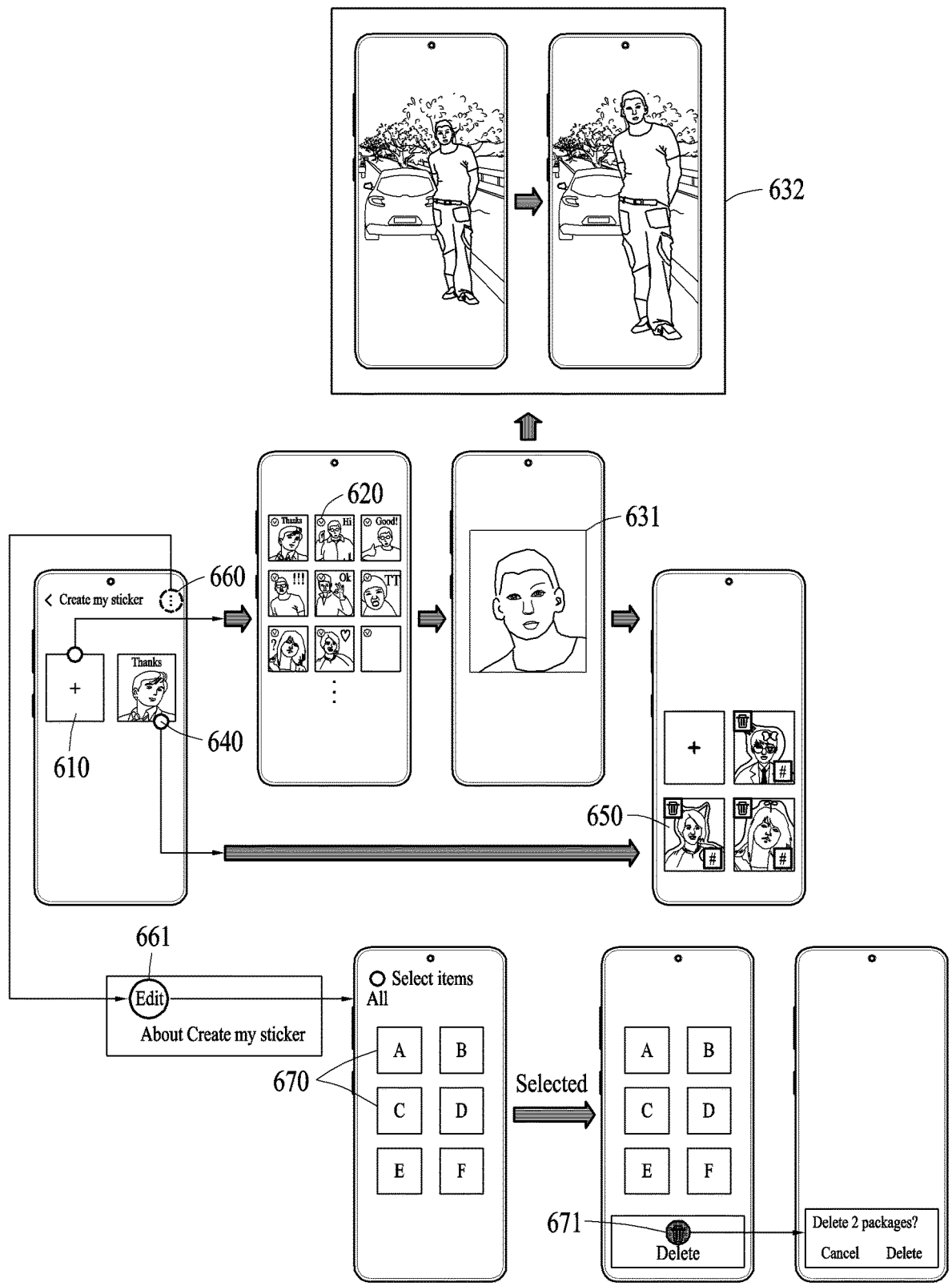
FIGS. 6A and 6B are diagrams illustrating examples of generating a sticker according to certain embodiments.
Figure 6B:
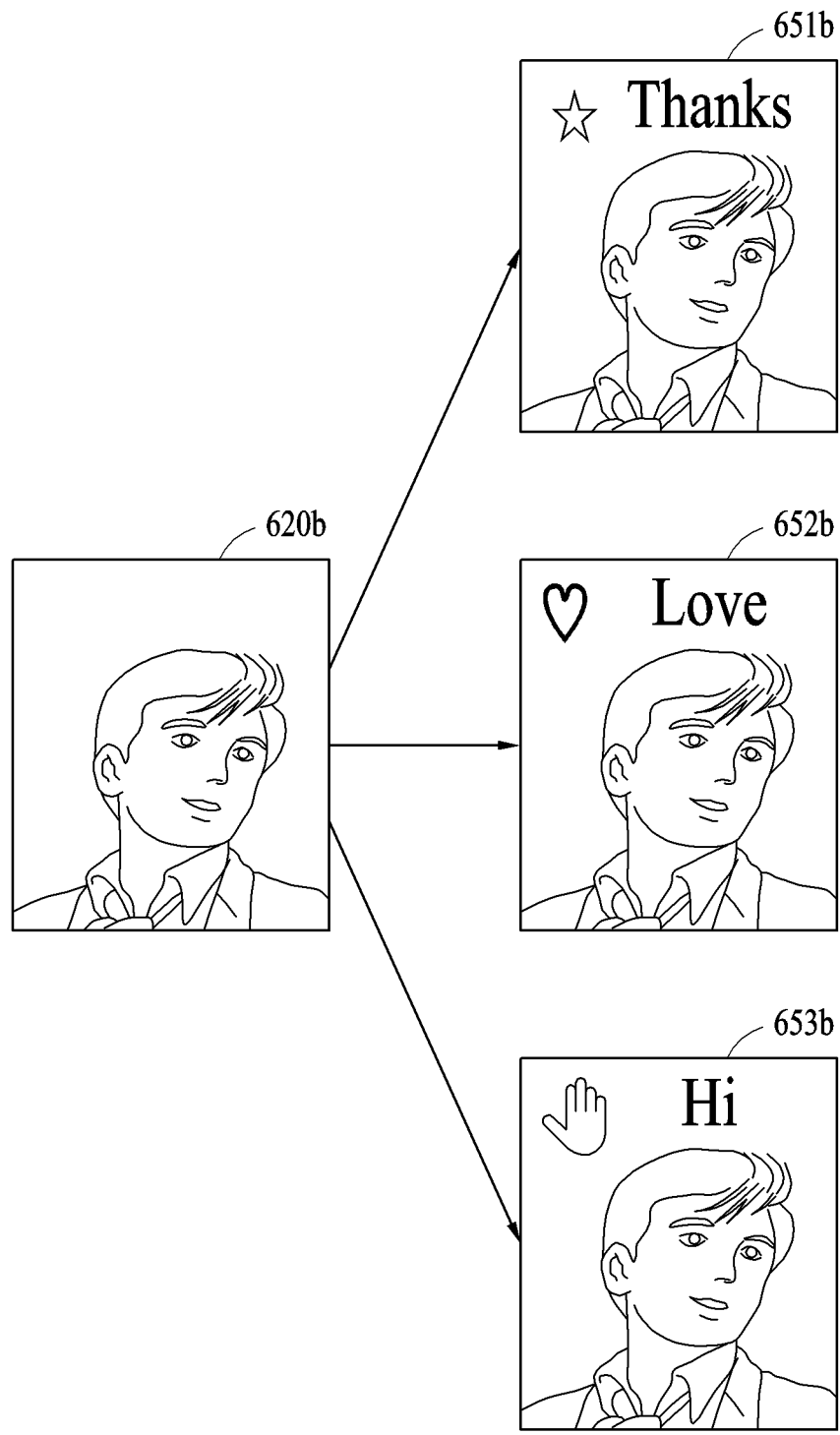

FIGS. 6A and 6B are diagrams illustrating examples of generating a sticker according to certain embodiments.

An electronic device (e.g., the electronic device 101 of FIG. 1) may initiate a generation of a new sticker package in response to a input 610 requesting package generation. The electronic device may generate a sticker 650 to be included in a new sticker package from first content.

For example, the electronic device may select at least one first content from among accessible contents. The electronic device may obtain first content from at least one of content stored in an electronic device of a user and content stored in an external device accessible by the electronic device. In FIG. 6A, for example, the electronic device may select and obtain some content 620 as first content from content stored in an internal memory (e.g., the memory 130 of FIG. 1). If a plurality of first contents are selected, the electronic device may sequentially obtain each of the plurality of selected first contents and generate the sticker 650 from the obtained first content. The first content may be a file downloaded via the Internet and may include, for example, an image file in various formats such as GIF, BMP, JPG, MP4, and AVI.

The electronic device may generate the sticker 650 by editing, changing dimensions, and/or converting the obtained first content, or by adding an additional visual effect to the first content.

In an example, the electronic device may crop the first content. The electronic device may crop the first content by preserving a portion 631 of the obtained first content and deleting the other portions. Herein, cropping may not need to be performed, and the electronic device may add an auxiliary graphic representation that will be described below to the original first content.

In another example, the electronic device may separate an object and a background in the first content. The electronic device may extract the object by separating the object and the background shown in the first content. The electronic device may separate an object and a background in a video and an image with a GIF format in addition to a still image.

In another example, the electronic device may add an auxiliary graphic representation to the first content. The auxiliary graphic representation may be a graphic representation that is supplementally added to the first content, and may include, for example, a character string, a symbol, a figure, an emoji, other images, a handwriting based on a touch input, and a stylus pen writing based on a stylus input. The electronic device may add the above-described auxiliary graphic representation to an image including only the object extracted from the first content.

In another example, the electronic device may divide the first content into multi-layer images and converting each of the multi-layer images into an image with a perceptional depth. The electronic device may divide the first content into a plurality of layers (e.g., one or more foregrounds and one or more backgrounds), and convert each of the layers to an image with a perceptional depth by moving each of the layers based on monocular cues or adjusting a scale. The monocular cues, which are factors that give a three-dimensional effect by a monocular, may include, for example, focus adjustment, motion parallax, visual field size, retinal size, aerial perspective, linear perspective, shadows, and overlapping.

The electronic device may perform any one or any combination of the above-described operations to generate the sticker 650. The electronic device may include the generated sticker 650 in a sticker package. An operation of generating a new sticker package has been described above, however, there is no limitation thereto. For example, if an input 640 to select the pre-generated sticker package is detected, the electronic device may provide the sticker 650 included in the pre-generated sticker package to a user.

For reference, as shown in FIG. 6B, the electronic device may generate a plurality of stickers 651b, 652b, and 653b from selected content 620b. For example, the electronic device may generate a plurality of stickers 651b, 652b, and 653b corresponding to a set of emotions preset and/or defined by a user from the selected content 620b. For example, the electronic device may modify the content 620b to simulate the facial expression to a thankful emotion 651b, a love emotion 652b, and a salutation emotion 563b. For example, the electronic device may generate the plurality of stickers 651b, 652b, and 653b by editing, deforming, and/or converting the content 620b using deep learning based on the emotions preset or defined by the user, or by adding an auxiliary graphic representation corresponding to the emotion preset to the content 620b using deep learning.

The electronic device may edit the generated sticker package or map second content. For example, the electronic device may provide a function 661 of editing the pre-generated sticker package, through an additional menu 660. In response to a selection input 670 and a deletion input 671 for the pre-generated sticker package, the electronic device may delete a selected sticker package. Mapping of the second content to the sticker 650 in a sticker package will be described below with reference to FIG. 10.

Figure 7:
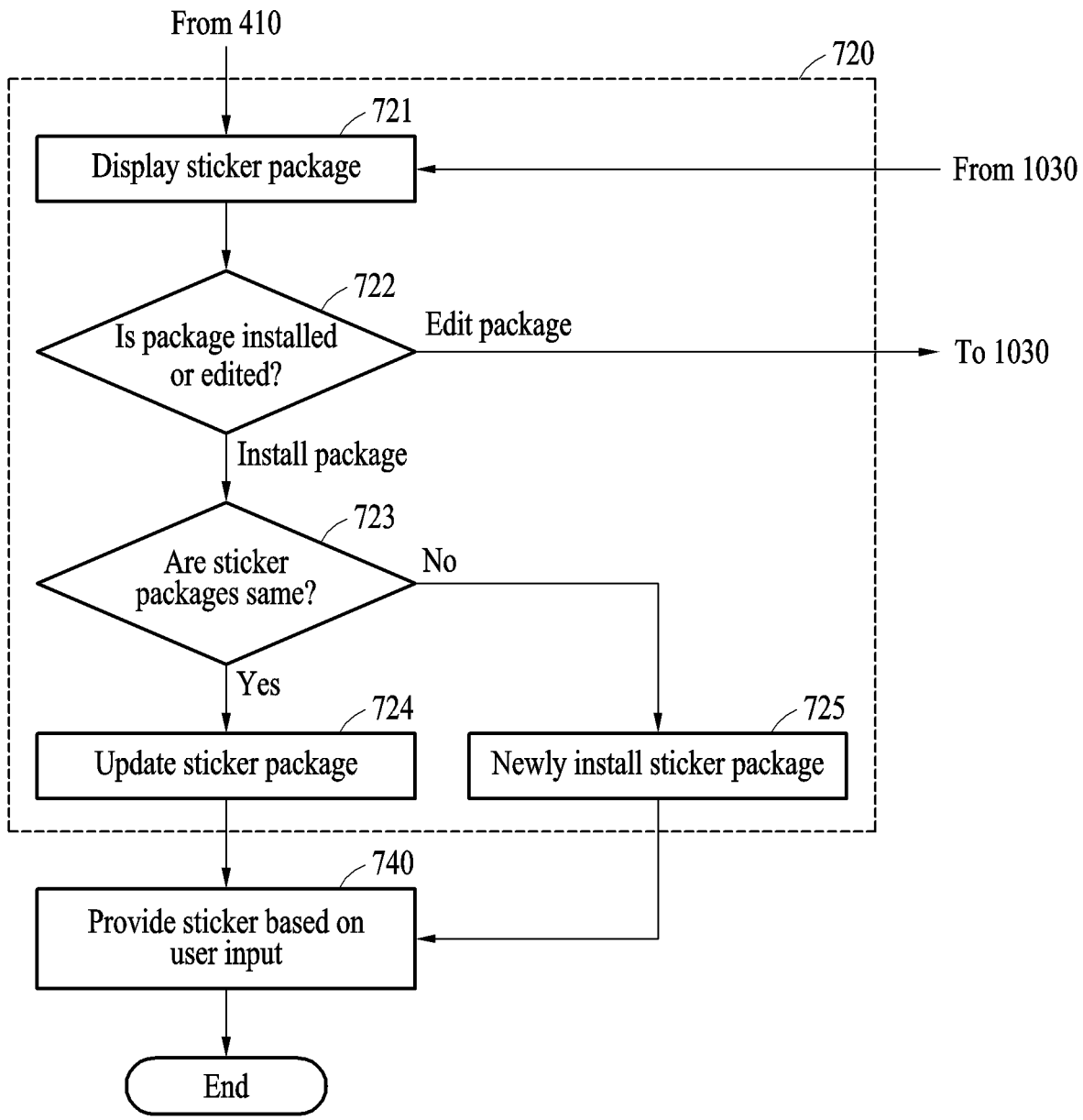
FIGS. 7 to 9 are diagrams illustrating an operation of installing a sticker package according to certain embodiments.
Figure 8:
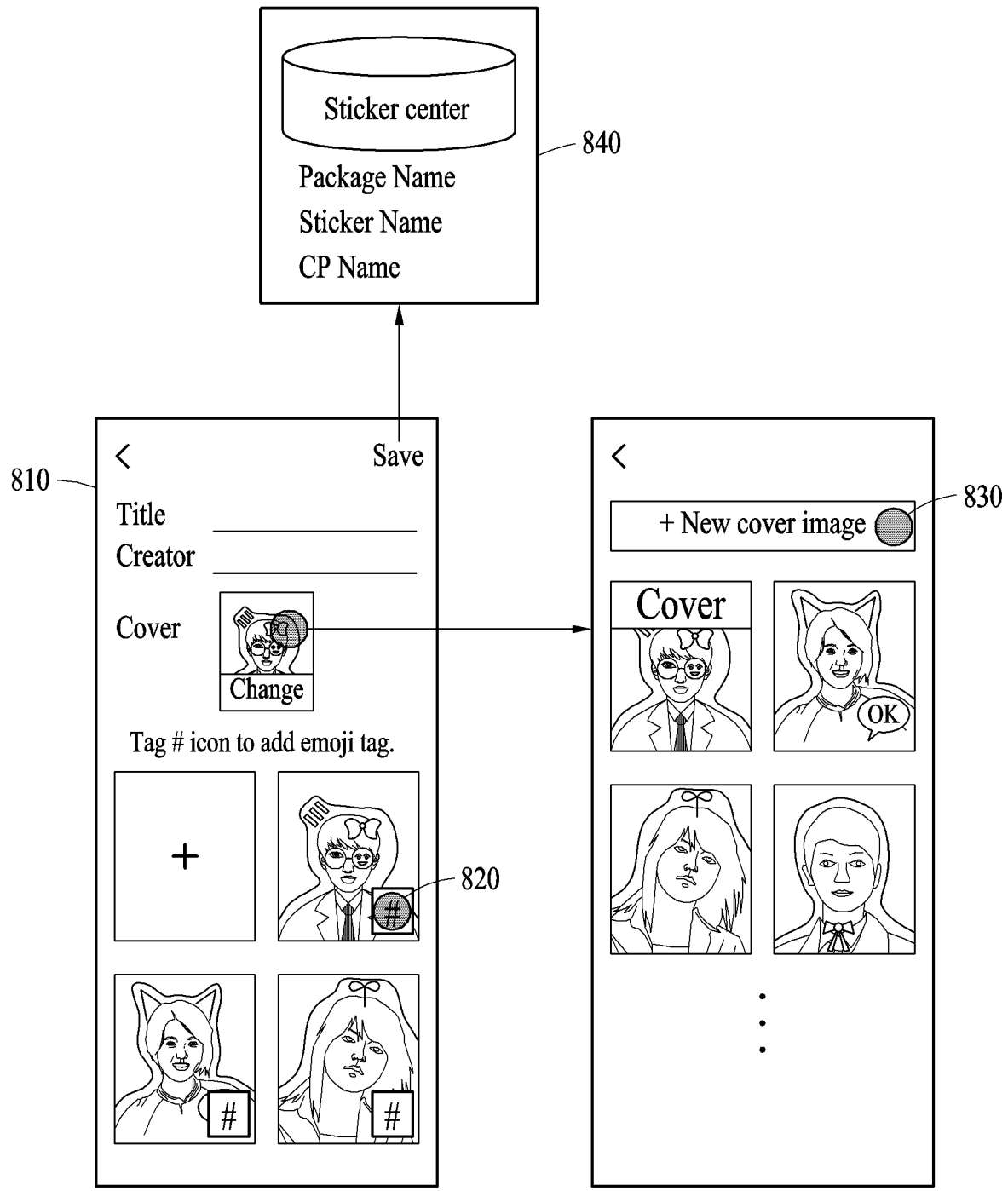
Figure 9:
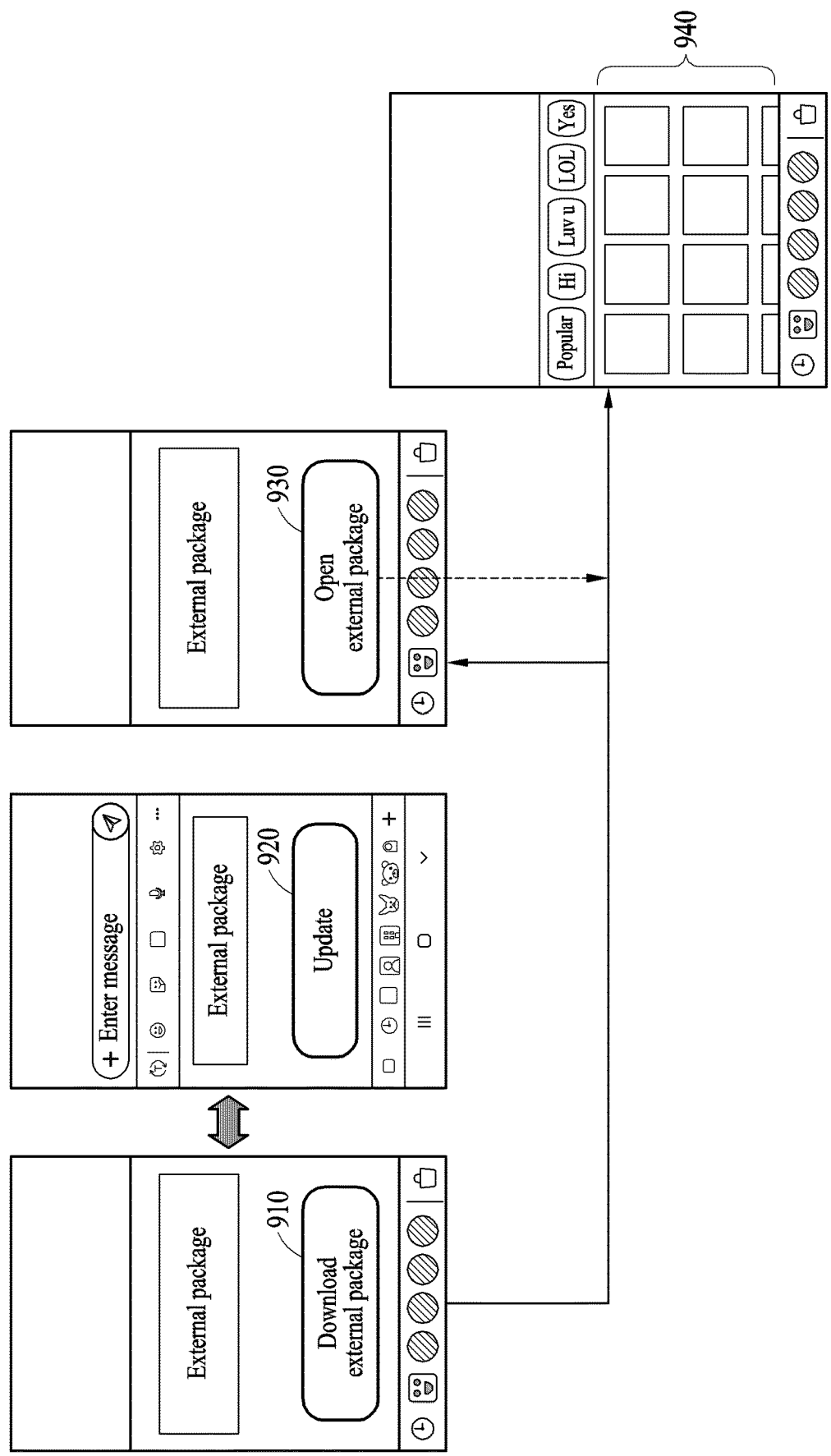

FIGS. 7 to 9 are diagrams illustrating an operation of installing a sticker package according to certain embodiments.

In operation 720, an electronic device (e.g., the electronic device 101 of FIG. 1) may install a sticker package in a keyboard application. For example, in operation 721, the electronic device may display an installable sticker package. In operation 722, the electronic device may determine whether to install or edit the sticker package. If the sticker package is determined to be edited, the electronic device may perform operation 1030 of FIG. 10 that will be described below.

In operation 723, the electronic device may determine whether a sticker package to be installed is the same as a sticker package pre-installed on the keyboard application. In response to the sticker package to be installed being the same as a sticker package pre-installed on the electronic device, the electronic device may update the pre-installed sticker package in operation 724. For example, the electronic device may update an existing package with a sticker package 810 in a sticker center 840, as shown in FIG. 8. In response to the same package as the sticker package to be installed not being found, the electronic device may newly install a sticker package in operation 725. For example, the electronic device may newly install a sticker package in the sticker center 840. In the present specification, a sticker center may be an application that stores a sticker package and allows other applications to use the sticker package through a content provider.

For example, FIG. 8 illustrates installation of the sticker package 810 generated by a user. The electronic device may generate the sticker package 810 by packing one or more generated stickers. According to an example embodiment, an electronic device may generate the sticker package 810 by grouping a plurality of stickers with any one or any combination of a name, a cover image, and creator information representing the plurality of stickers. For example, the electronic device may determine a title, a creator, and a cover image of the sticker package 810 based on a user input. In response to a user input 830, the electronic device may determine one of one or more stickers included in the sticker package 810 as a representative sticker of the sticker package 810, and determine the representative sticker as the above-described cover image. The electronic device may update or newly install the completely generated sticker package 810 in the sticker center 840 in operations 724 and 725 described above. The electronic device may inform the keyboard application of completion of the updating and/or installation of the sticker package 810. In addition, the electronic device may map the second content to a sticker of the sticker package installed in the sticker center 840, in response to a content mapping input 820, which will be described below with reference to FIGS. 10 to 13.

For example, FIG. 9 illustrates installation of a sticker package generated by another user. The electronic device may download an external package in response to a user input 910. In addition, the electronic device may request an update of the external package in response to a user input 920. The external package may be, for example, a sticker package generated by another user. The electronic device may display a sticker 940 of an installed external package, in response to a user input 930 for the external package.

In operation 740, the electronic device may provide a sticker according to a user input, based on the sticker package installed in the keyboard application. An example of providing a sticker will be described below with reference to FIGS. 14 to 18.

FIGS. 10 to 13 are diagrams illustrating a mapping between a sticker and second content according to certain embodiments.

Figure 10:
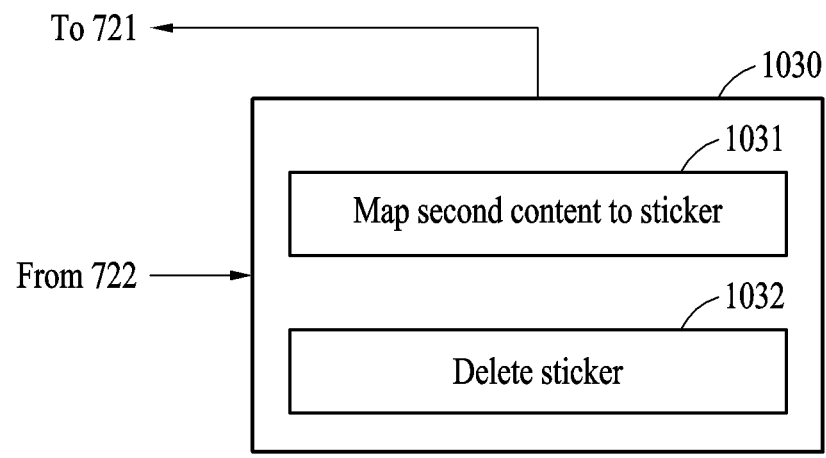
FIGS. 10 to 13 are diagrams illustrating a mapping between a sticker and second content according to certain embodiments.

An electronic device (e.g., the electronic device 101 of FIG. 1) may manage a sticker of a sticker package generated in operation 1030 of FIG. 10. According to an example embodiment, the electronic device may delete a sticker from the sticker package in operation 1032. For example, the electronic device may delete a sticker in response to a deletion input 1190 of FIG. 11.

Figure 11:
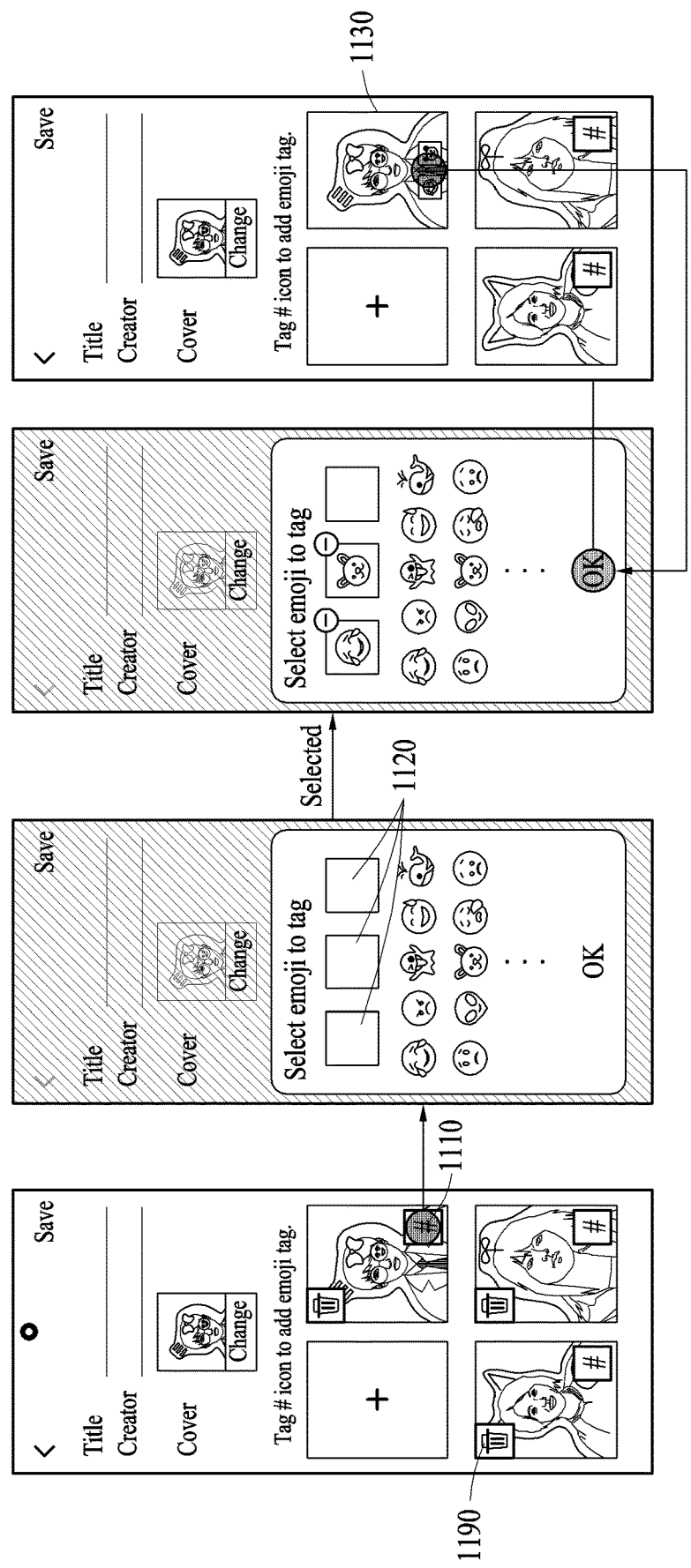

The electronic device may map second content to a sticker in operation 1031. For example, the electronic device may enter a graphical user interface (GUI) to map the second content to the sticker in response to a mapping input 1110 of FIG. 11. The electronic device may present a plurality of candidate contents that may be mapped to a selected sticker by the mapping input 1110. Candidate content is illustrated as an emoji that includes various types of emotion information (e.g., happiness) and behavior information (e.g., wink) in FIG. 11, however, the example embodiments are not limited thereto. The electronic device may map content, which is selected from the plurality of candidate contents in response to a user input 1120, as the second content to the sticker. A corresponding sticker may be mapped to up to three emojis as second content as shown in FIG. 11, however, the example embodiments are not limited thereto. As described above, the electronic device may map any one or any combination of a character string, an emoticon, an emoji, a voice, a tag, a URL, a user gesture, and AR information, as second content to a corresponding sticker.

The electronic device may determine and map the second content based on description information of the sticker. Here, the electronic device may present candidate contents based on the description information, determine the second content according to a manual input to select one of the candidate contents or automatically determine the second content based on the description information, and map the second content to the sticker.

For example, the electronic device may extract description information associated with a sticker by analyzing the sticker. The description information, which is information to describe a sticker, may include, for example, one or more items among a scene type of the sticker, tag information corresponding to the sticker, a URL associated with first content corresponding to the sticker, memo, voice, video and an image associated with the first content, position information associated with the first content, and content source information for the sticker. The scene type may be a type for describing a scene captured in first content that is a basis for generating a sticker, and may include, for example, a type of an object (e.g., a body part including a face, a person, an inanimate object, and an animal) included in a sticker, a situation of an object (e.g., human emotions, human walking, and driving of a vehicle), a type of a background (e.g., an indoor place, an outdoor place, a mountain, sea, and a city), a lighting state (e.g., a low illuminance state, and a backlit state), a document type (e.g., a business card), and a code type (e.g., quick response (QR) code information). The content source information may be information indicating a source of the original content used to generate a sticker. The electronic device may extract the above-described description information by analyzing the sticker when attempting to map the second content to the sticker, however, there is no limitation thereto. For example, the electronic device may extract and store, in advance, the above-described description information based on the first content at a timing of generating a sticker. An example of analyzing an image of the first content and extracting the description information will be described below with reference to FIG. 13.

The electronic device may present at least one candidate content for the sticker based on the extracted description information. In an example, the electronic device may identify a person's emotion (e.g., happiness) as a situation of an object from the extracted description information, and present candidate content (e.g., an emoji indicating happiness) corresponding to the identified emotion as a mapping candidate for the sticker. In another example, the electronic device may identify a type of an object (e.g., a dog as an animal) from the description information and present candidate content corresponding to the identified type (e.g., an emoji corresponding to a dog) as a mapping candidate for the sticker. In another example, the electronic device may identify a URL from the description information and present the identified URL as a mapping candidate for the sticker. In another example, the electronic device may identify the preset or user defined emotion used for generating the sticker. However, examples of presenting candidate content are not limited to the above description, and the electronic device may present candidate content in various ways based on various items of the description information.

The electronic device may map content, which is selected from the at least one presented candidate content based on at least one of a selection by a user input and an automatic selection, as second content to a generated sticker. The electronic device may map the candidate content selected by a user from a plurality of candidate contents as the second content to the sticker. The electronic device may map candidate content that may be identical or most similar to the description information among the plurality of candidate contents as the second content to the sticker. For example, if the description information includes a plurality of items (e.g., a happy emotion and a puppy), the electronic device may automatically map candidate content (e.g., an emoji indicating a smiling puppy) with a largest number of items matched to the plurality of items of the description information among the plurality of candidate contents as second content to the sticker. However, this is merely an example, and the automatic selection of the second content is not limited thereto.

In addition, the electronic device may map a plurality of second contents with various items to a single sticker. For example, the electronic device may also map a portion (e.g., content source information including a URL) of the description information as second content to a sticker. The electronic device may also map, as second content to the sticker, a portion of the description information together with candidate content selected from candidate contents presented based on the description information by a user input and/or an automatic input.

The electronic device may also output a sticker 1130 together with a graphic representation indicating second content mapped to a sticker in a sticker package. If a plurality of second contents are mapped to a sticker, the electronic device may output only a portion of the plurality of second contents. For example, if an emoji and a URL are mapped as second content to a sticker, the electronic device may output only the emoji together with the sticker.

Figure 12:
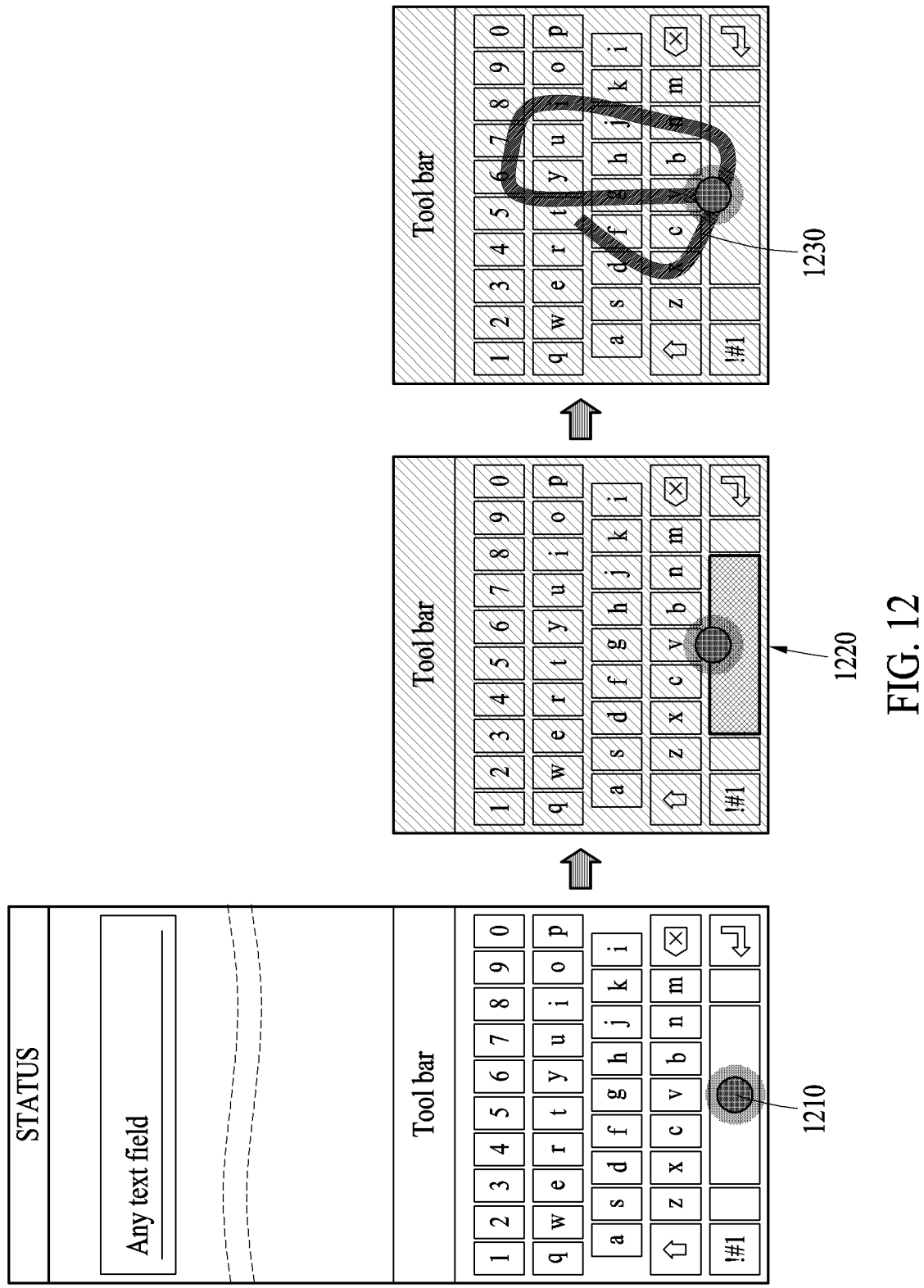

FIG. 12 illustrates an example of mapping a gesture according to a user input as second content to a sticker. For example, an electronic device may provide a gesture input 1220 in response to detecting an input to designate a predetermined key 1210 (e.g., a spacebar) for a period of time greater than or equal to a threshold time in a keyboard application. The electronic device may identify a user gesture based on a trajectory 1230 that is input during the gesture input 1220. The electronic device may map the identified user gesture as second content to a sticker.

Figure 13:
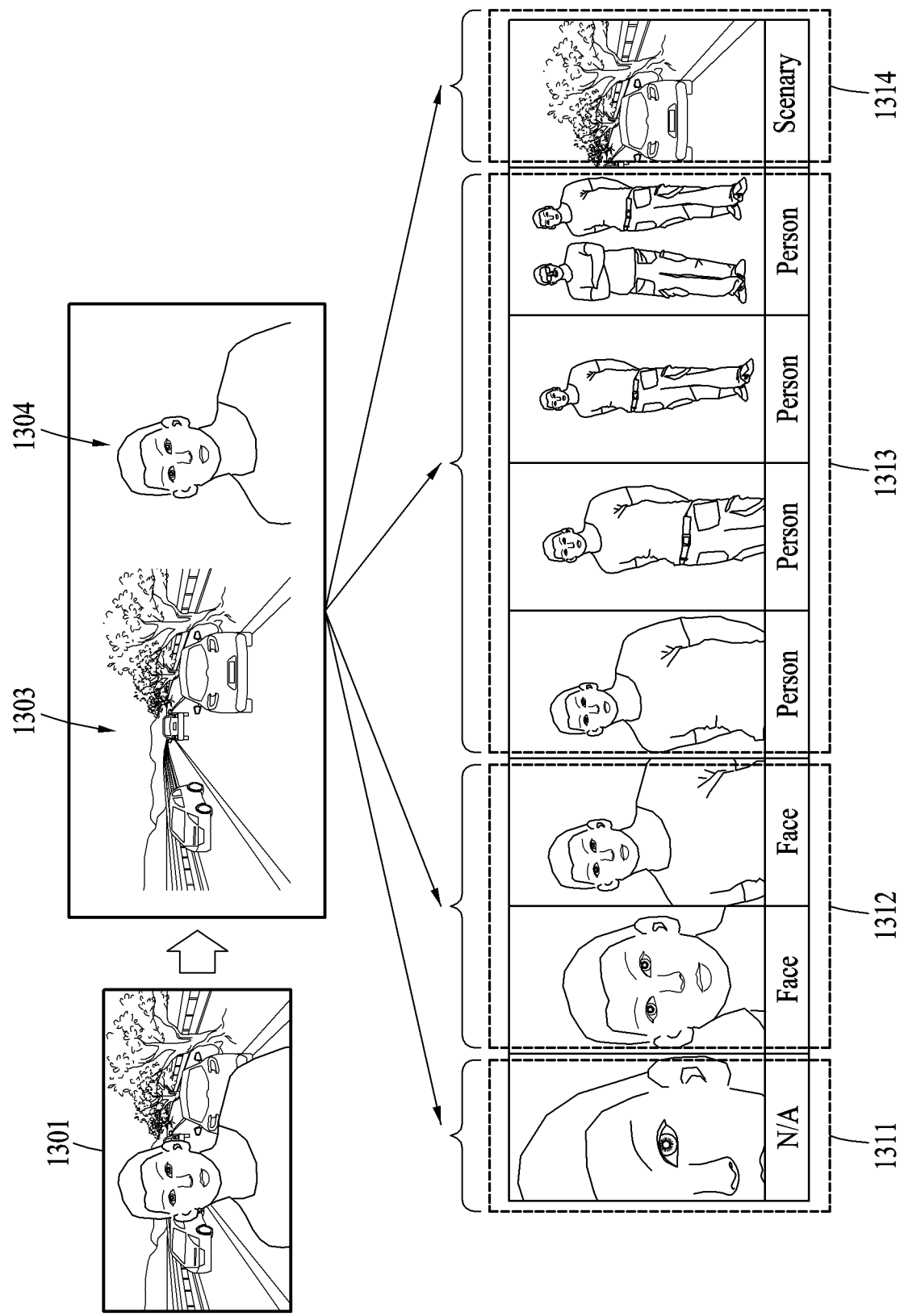

FIG. 13 illustrates an example of an extraction of description information. An electronic device according to an example embodiment may analyze an image 1301 corresponding to a sticker and/or first content that is a basis for generating the sticker, and may extract description information about the image 1301. For example, the electronic device may extract a background 1303 and an object 1304 from a scene corresponding to the image 1301. The object 1304 may be a person, an inanimate object, and an animal that are distinguished from the background 1303 and may mainly appear in a foreground, however, there is no limitation thereto.

The scene may represent the background 1303 and a subject captured in an image, and a scene type may be classified according to a situation and a relationship between the subject and the background 1303. For example, the scene type, which is a type for describing a scene of an image, may include a type of the object 1304, a situation of the object 1304, a type of the background 1303, a lighting state, a document type, and a code type, as described above.

The type of the object 1304 may include, for example, a face, a baby, a person, a dog, a cat, food, people, a vehicle, drink, flower, tree, an animal and shoes. For example, a face type 1312 may be a type for describing a photograph focused on a face, for example, a big close-up shot, a close-up shot, and a bust shot. A person type 1313 may be a type for describing an image obtained by capturing a half body or the entire body, for example, an image captured from a head to a waist, an image captured from a head to a knee, and an image obtained by capturing the entire body. Dog, cat and animal types may be types for describing images of which an area occupied by an animal is greater than or equal to a threshold percentage (e.g., 25%). A food type may be a type for describing an image obtained by capturing food placed on a plate. A people type may be a type for describing an image obtained by capturing two or more people. A flower type may be a type for describing an image of which a flower area is greater than or equal to a threshold percentage (e.g., 25%).

The type of the background 1303 may include, for example, a beach, sky, a mountain, a sunset, a sunrise, a city, snow, waterfall, waterside, scenery, a stage, greenery, and an indoor place. A beach type may be a type for describing an image obtained by capturing a beach. A sky type may be a type for describing an image in which a threshold percentage (for example, 80%) or higher is sky. A mountain type may be a type for describing an image obtained by capturing a ridge. A snow type may be a type for describing an image obtained by capturing snow on a roof and a snowy mountain. Sunset and sunrise types may be types for describing images containing the sun. A waterfall type may be a type including a stream of water. A city type may be a type for describing an image obtained by capturing a street, a city view, and a high-rise building. A waterside type may be a type for describing an image obtained by capturing water such as a lake and a river. A greenery type may be a type for describing an image obtained by capturing a compositive natural object. An image in which the object 1304 is not identified, or an image representing an ambiguous beach, or an image representing ambiguous morphological features of a mountain, a stream, and a ridge may be classified as a scenery type 1314. An indoor type may be a type for describing an image obtained by capturing the object 1304 placed in an indoor place.

The lighting state may include, for example, backlit, and low lighting. A low lighting type may be a type for describing an image having an illuminance that is less than or equal to a threshold value.

The document type may include, for example, a document, a picture, a business card, and a book, and may represent an object 1304 having a rectangular frame.

The electronic device may analyze a scene type of an image by analyzing an object and a background, and extract the analyzed scene type as description information, as shown in FIG. 13. For example, the electronic device may analyze the scene type of the image using deep learning and/or artificial intelligence technologies. If the scene type is not specified, the electronic device may classify the scene type as an unclassified type 1311 (e.g., N/A). The description information may be used to determine second content to be mapped to a sticker, as described above, or the description information itself may be mapped as second content to a sticker.

Figure 14:
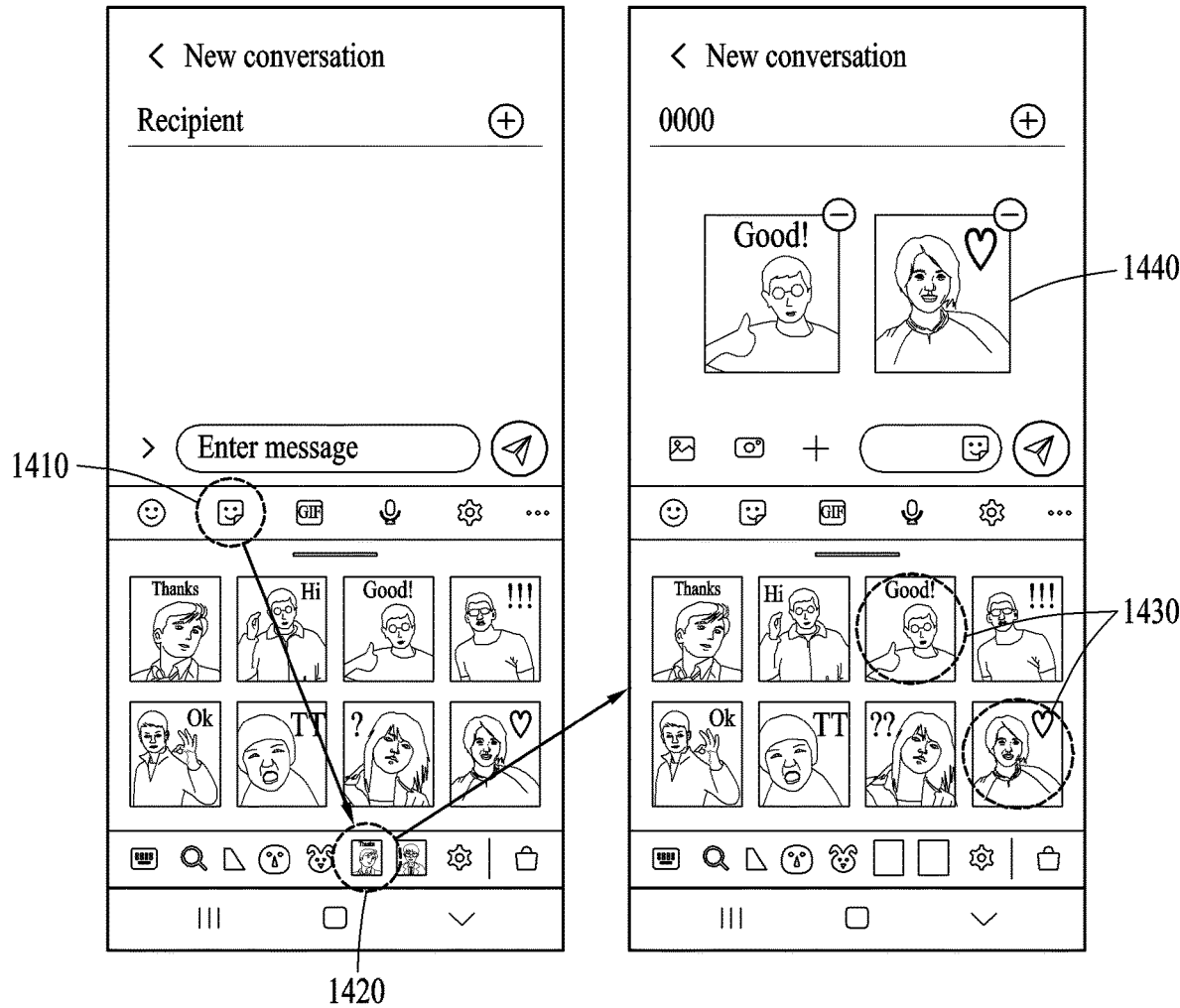
FIG. 14 is a diagram illustrating a selection of a sticker according to certain embodiments.

FIG. 14 is a diagram illustrating a selection of a sticker according to certain embodiments.

According to an example embodiment, a keyboard application invoked from a second application may provide a GUI related to providing a sticker. For example, the electronic device may provide sticker packages in response to a user input for a sticker menu 1410. The electronic device may present stickers included in a target sticker package 1420, in response to an input to select the target sticker package 1420 from a plurality of sticker packages. In response to an input to select a target sticker 1430 from the stickers in the target sticker package 1420, the electronic device may output a graphic representation 1440 corresponding to a selected sticker.

An operation of manually selecting a sticker by a user is described above as shown in FIG. 14, however, the example embodiments are not limited thereto. Hereinafter, an operation of predicting candidate stickers based on a user input and selecting the target sticker 1430 from the predicted candidate stickers according to a user input will be described.

FIGS. 15 to 18 are diagrams illustrating sticker recommendations according to certain embodiments.

An electronic device (e.g., the electronic device 101 of FIG. 1) may provide a sticker mapped to second content, in response to receiving an input related to the second content in a keyboard application. The input related to the second content may be, for example, an input of the second content itself and/or an input that is a basis for a prediction of the second content.

Figure 15:
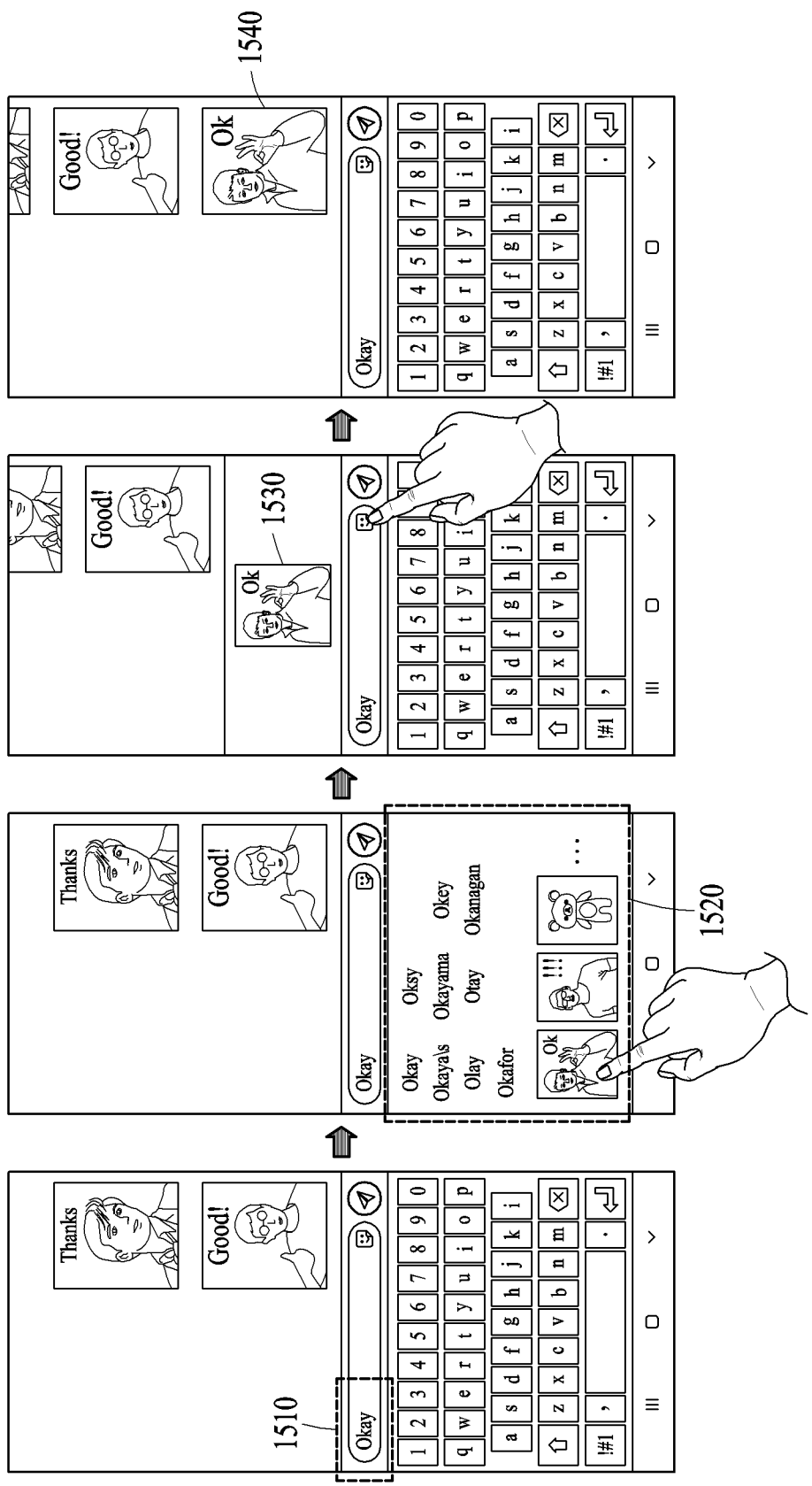
FIGS. 15 to 18 are diagrams illustrating sticker recommendations according to certain embodiments.

According to an example embodiment, FIG. 15 illustrates an operation in which the electronic device provides a sticker in response to receiving an input that is a basis for a prediction of the second content. In response to the second content being included in prediction content retrieved based on a user input received in the keyboard application, the electronic device may display the second content and the sticker mapped to the second content on a prediction area 1520 of the keyboard application. The electronic device may interpret a user's input intention by analyzing the user input, and retrieve prediction content corresponding to the interpreted input intention. The prediction content may be content predicted to be intended as an input by a user. In FIG. 15, the electronic device may receive a character string input 1510 "Okay" from a user. The electronic device may retrieve a variety of prediction content from the character string input 1510. The electronic device may retrieve and present another completed character string and an emoji corresponding to the character string, in response to the character string input 1510. The electronic device may retrieve a sticker to which the prediction content is mapped as second content. For example, an okay emoji may be mapped to a target sticker, as shown in FIG. 15. As described above, the electronic device may retrieve the okay emoji as prediction content from the character string input 1510, and display the target sticker to which the okay emoji, which is the retrieved prediction content, is mapped on the prediction area 1520.

In response to a sticker displayed on the prediction area 1520 being selected by a user input, the electronic device may provide the sticker mapped to the second content to a second application. For example, the electronic device may provide a target sticker, which is selected in response to an input to select the sticker displayed on the prediction area 1520, to an input area 1530 of the second application. If the second application is a messenger application, the electronic device may send a sticker provided to the input area 1530 to another electronic device, in response to an outgoing input. For example, the sticker may be transmitted in an image format. The electronic device may output a sent sticker 1540 using the second application.

However, the example embodiments are not limited thereto, and the electronic device may receive an input of the second content (e.g., an okay emoji) itself. The electronic device may recommend the sticker mapped to the input second content to the prediction area 1520. In response to a plurality of stickers mapped to the second content being retrieved based on an input related to the second content, the electronic device may display the plurality of stickers on the prediction area 1520 of the keyboard application. For example, if an okay emoji is mapped to the plurality of stickers, the electronic device may recommend the above-described plurality of stickers when receiving the okay emoji. In addition, the electronic device may preferentially display a sticker belonging to a custom package installed by a user among a plurality of sticker packages on the prediction area 1520 while detecting a series of user inputs related to the second content in the keyboard application. The custom package may be a sticker package generated by a user of the electronic device. For example, the electronic device may output a target sticker belonging to a custom package among the retrieved stickers such that the target sticker may be exposed earlier than a sticker belonging to another sticker package, in response to a user input related to the second content. For example, in the example shown in FIG. 15, the target sticker belonging to the custom package may be disposed on the left side in the prediction area 1520. In response to one sticker being selected from the plurality of stickers, the electronic device may provide the selected sticker to the second application. For example, the electronic device may share a custom sticker generated by a user with other users by distributing and/or sharing the custom package.

Figure 16:
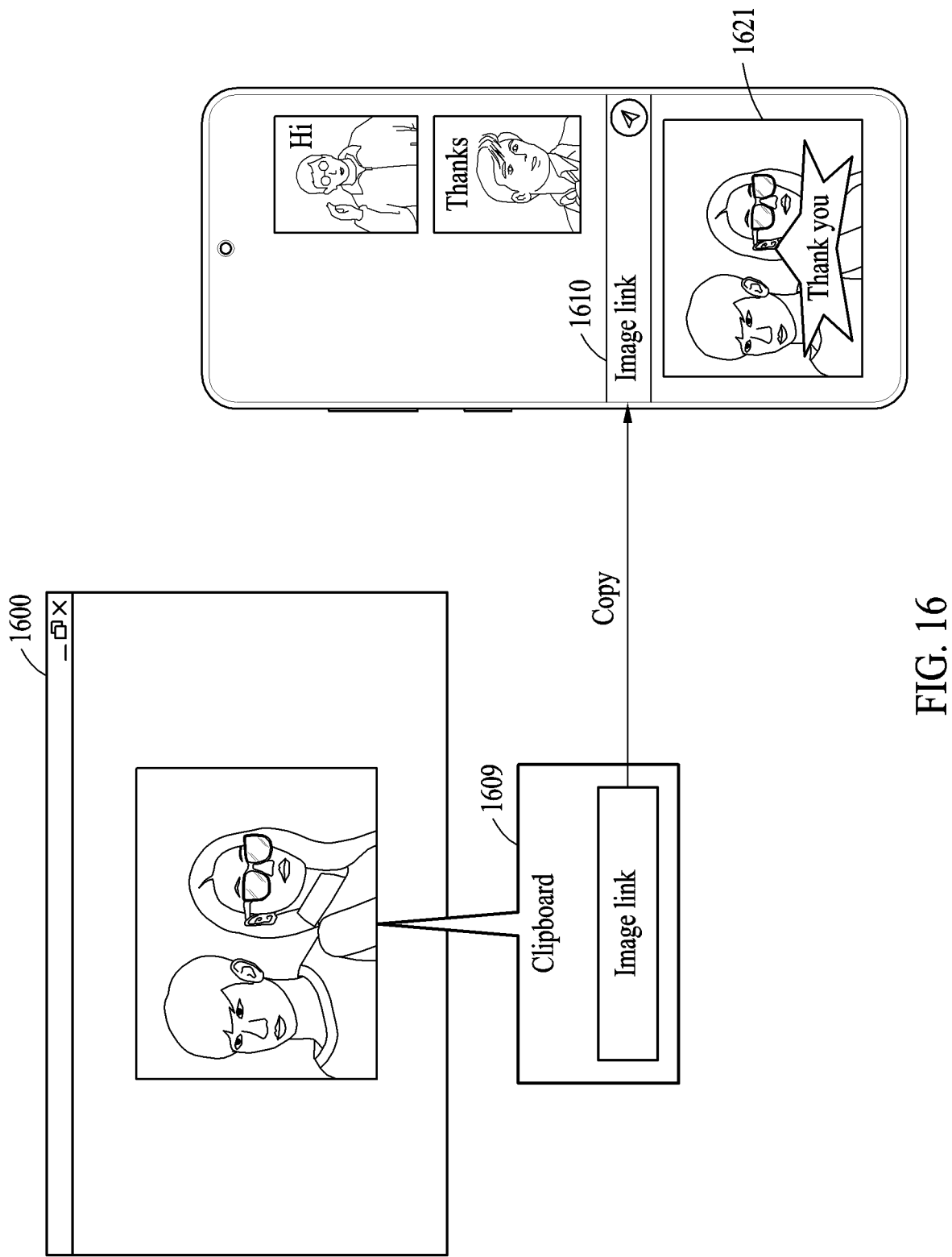

According to an example embodiment, FIG. 16 illustrates an example of inputting information copied to a clipboard as a user input related to second content. The electronic device may recommend a sticker matching a result obtained by analyzing the clipboard to the prediction area 1520.

For example, the electronic device may extract content source information by analyzing the clipboard. The electronic device may compare the content source information extracted from the clipboard with content source information mapped as second content to each sticker, and determine a sticker to be recommended based on a comparison result. The electronic device may recommend, to the prediction area 1520, a sticker mapped to content source information that is identical or similar to the content source information extracted from the clipboard. The content source information may be information indicating a source of the original content used to generate a sticker, and may include, for example, an author of the original content, a website address (e.g., a URL) where the original content is posted, and a position (e.g., physical coordinates indicating a position in which the original photograph is obtained) in which the original content is generated. The original content may be first content itself, or content that is not processed into the first content when the first content is processed from another content. The content source information may be obtained from the result of analyzing the first content. For example, the content source information may be extracted from metadata of the first content or obtained from a result obtained by analyzing the first content itself and/or the metadata of the first content.

For example, as shown in FIG. 16, the electronic device may allow copying of an image posted on a website 1600 to the clipboard. The copying to the clipboard may be performed through various interaction inputs of a user. A user's interaction may include, for example, a touch input, a voice input, a gesture input, and a stylus pen input to a display. An example of copying an image link 1610 is shown in FIG. 16, however, the example embodiments are not limited thereto. The electronic device may copy a variety of data including text desired by a user, text posted on the Internet, text of a received message, an image posted on the Internet, and an image shared through an SNS to the clipboard.

The electronic device may analyze data 1609 (hereinafter, referred to as "clipboard data") copied to the clipboard. The electronic device may identify a hypertext markup language (HTML), an image, a character string, a uniform resource identifier (URI), a URI list, and an intent object from the clipboard data 1609. In an example, the electronic device may identify, from an image copied to the clipboard, a character string based on optical character recognition (OCR), a QR code, and a type of an object included in the image. In another example, the electronic device may identify, from a character string copied to the clipboard, an email address, a contact (e.g., a telephone number), a physical address, a URL address, tag information, a date, and time. In another example, the electronic device may identify whether copied data is of an intent type designated to be pasted without a change.

The electronic device may also classify an input character string (e.g., a sentence) using a trained machine learning model. The trained machine learning model may include a deep learning model (e.g., a recurrent neural network (RNN), a long short-term memory (LSTM), gated recurrent units (GRU), a recurrent neural network language model (RNNLM), and a reinforcement learning model. The electronic device may perform text classification on the clipboard data 1609. The text classification may be a task of receiving text as an input and identifying a class to which the text belongs. For example, URI classification may be a task of performing classification into a class that belongs to one of two categories, e.g., a text category and a URI domain category (e.g., .com, co.kr, and .kr). Binary classification may be a task of performing classification into one of two classes (e.g., text, and a URI), and multi-class classification may be a task of performing classification into one of at least three classes (e.g., text, a URI, and a telephone number).

The electronic device may perform an emotion analysis of classifying whether a sentence is a positive text or negative text, in addition to URI classification, from sentence data by a user input. In addition, the electronic device may perform an intention analysis of classifying a user's intention into classes such as questions, commands, and rejections, from a received sentence.

The electronic device may generate a user input pattern model based on a word according to a user's input pattern and a word according to an input pattern for each application among items extracted from the clipboard data 1609. The electronic device may determine prediction content based on a user input, a user input pattern model, application information, and text field information, and recommend a sticker based on the prediction content.

The electronic device shown in FIG. 16 may identify the image link 1610 as a result obtained by analyzing the clipboard data 1609, and may recommend a target sticker 1621 mapped as second content to the image link 1610 to a prediction area.

The example of inputting a character string as the clipboard data 1609 has been mainly described, however, the example embodiments are not limited thereto. The clipboard data 1609 may also include information about a copied image. The electronic device may also extract a scene type by analyzing the image of the clipboard data 1609 in a similar manner as that described above with reference to FIG. 13. The electronic device may recommend a sticker based on the extracted scene type. For example, the electronic device may extract the scene type from an image copied to a clipboard and/or an image corresponding to a link copied to the clipboard. The electronic device may predict a sticker mapped to second content that matches the scene type extracted from the clipboard data 1609. For example, if an object included in an image of the clipboard data 1609 corresponds to "people" as shown in FIG. 16, the electronic device may recommend target content 1621 with a scene type of "people" to the prediction area.

Figure 17:
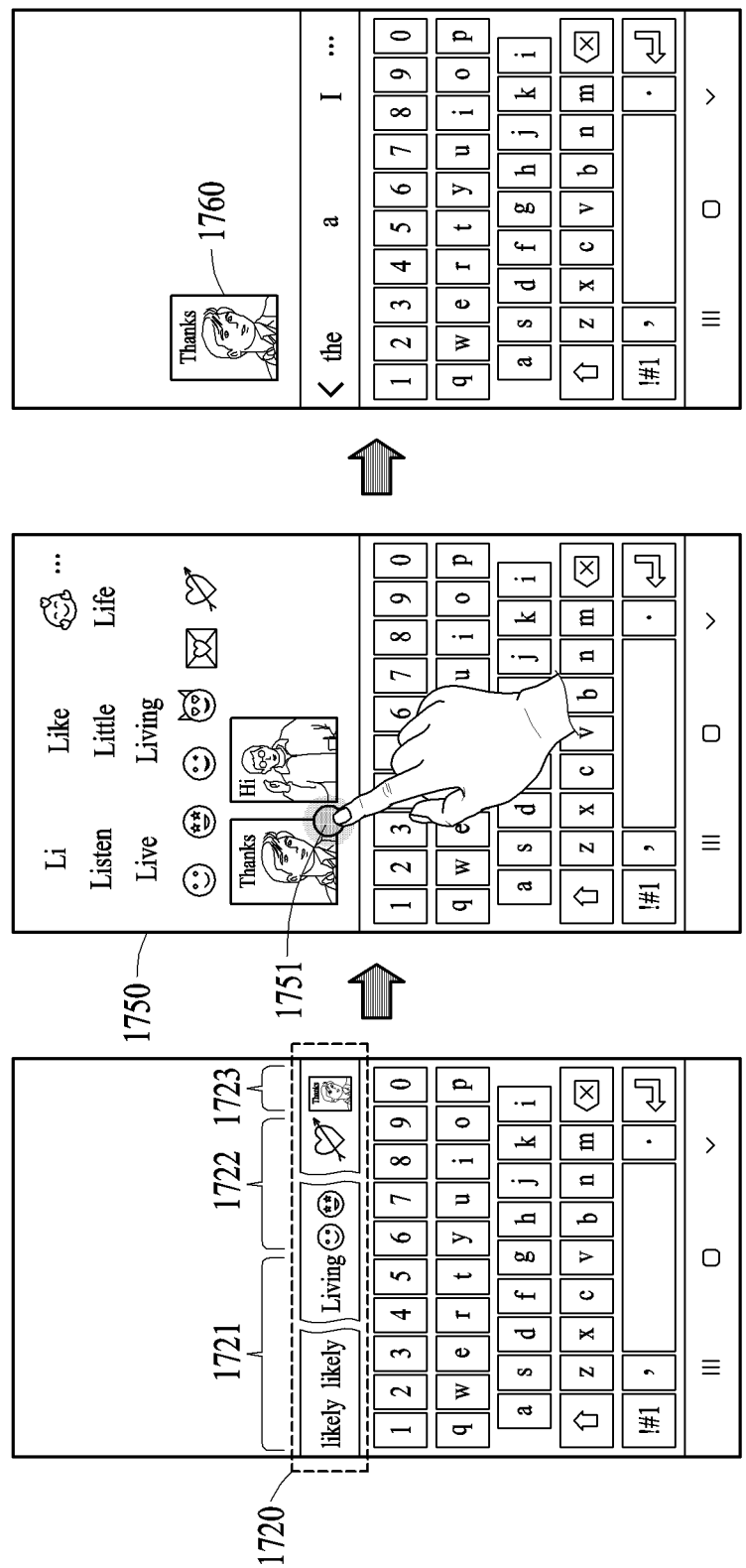

FIG. 17 illustrates a prediction area.

As described above, an electronic device may present prediction content based on a user input (e.g., a character string input, a clipboard copy, and content attachment). The prediction content may display a prediction character string, a prediction emoji, and a prediction sticker. The electronic device may display a prediction character string in a first portion 1721 of a prediction area 1720, display a prediction emoji in a second portion 1722 of the prediction area 1720, and display a prediction sticker in a third portion 1723 of the prediction area 1720. The electronic device may first display the prediction character string, and may sequentially display the prediction emoji and the prediction sticker. The electronic device may divide the first portion 1721 according to a number of words and display a prediction word in divided portions. Similarly, the electronic device may divide the second portion 1722 according to a number of predicted emojis, and display the prediction emoji in divided portions. In addition, the electronic device may divide the third portion 1723 according to a number of predicted stickers and display the prediction sticker. If a size of an area occupied by prediction content exceeds a size of the prediction area 1720, the electronic device may display at least one of prediction character strings on the first portion 1721, display at least one of prediction emojis on the second portion 1722, and display at least one of prediction stickers on the third portion 1723. Therefore, the electronic device may provide a thumbnail of a sticker predicted to be recommended to the third portion 1723 (e.g., a rightmost portion) regardless of a priority of each prediction content, despite an insufficient display space. If a character string recommendation engine, an emoji recommendation engine, and a sticker recommendation engine independently operate in different modules, it may be difficult or impossible to determine a priority of each prediction content. As described above, the electronic device may display each prediction content at a fixed position in the first portion 1721, the second portion 1722, and the third portion 1723, thereby preventing an omission of a recommendation.

The electronic device may additionally present prediction content that is not exposed due to space limitations, in response to a scroll input (e.g., a horizontal movement of a touch point along a horizontal axis) to the prediction area 1720. If a messaging application is executed by the electronic device, the electronic device may recommend different prediction content for different users to which a message of the messaging application is to be sent. For example, based on any one or any combination of a social relationship between a user and another user to which a message is to be sent, and a gender, an age and an identity of the other user, the electronic device may determine prediction content that is recommended to be sent to the other user among a plurality of contents, The electronic device may switch the prediction area 1720 to an extension area 1750 in response to a user input to the third portion 1723. The electronic device may classify the extension area 1750 into a character string portion, an emoji portion, and a sticker portion, and may also provide prediction content by performing grouping according to a type of each prediction content. For example, as shown in FIG. 17, the electronic device may recommend a prediction character string, a prediction emoji, and a prediction sticker in an upper portion, a middle portion, and a lower portion of the extension area 1750, respectively. However, although not shown in FIG. 17, the electronic device may display the extension area 1750 on the prediction area 1720 while displaying the prediction area 1720. Therefore, the electronic device may maintain positions in which a character string, an emoji, and a sticker are displayed for recommendation in a basic prediction area, thereby enhancing a usability of a user.

The electronic device may provide, to an input field of a second application, a target sticker 1760 which is selected in response to an input 1751 to select a sticker displayed on the prediction area 1720 and/or a sticker displayed on the extension area 1750.

Figure 18:
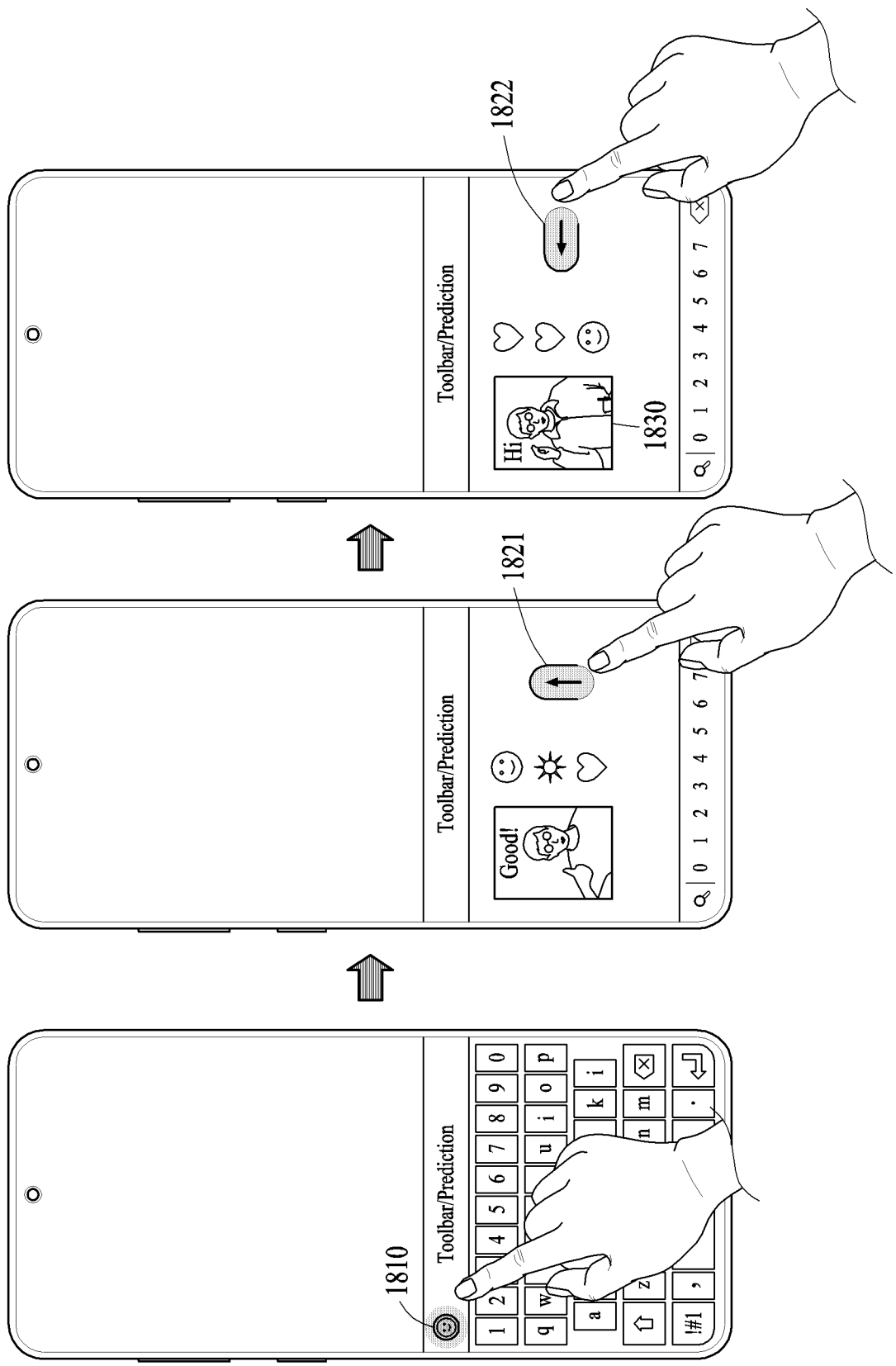

FIG. 18 is a diagram illustrating a sticker input according to a user gesture.

For example, an electronic device may enter a sticker GUI in response to a user input 1810. The electronic device may select a sticker 1830 based on various user gestures. The electronic device may select a sticker group, to which first description information is mapped, in response to a first gesture 1821, and may select the sticker 1830, to which second description information is also mapped, from the selected sticker group in response to a second gesture 1822. For example, the electronic device may change an object (e.g., an entertainer) that is a basis for generating a sticker in response to the first gesture 1821 (e.g., a swipe movement of a touch point along a first axis) in a selected sticker package. The electronic device may change an emotion type (e.g., pleasure and sadness) of an object selected as described above, in response to the second gesture 1822 (e.g., a swipe movement of a touch point along a second axis). The electronic device may designate the sticker 1830 to be input to the second application in the sticker package based on the first gesture 1821 and the second gesture 1822. However, the above-described first gesture 1821 and second gesture 1822 are merely examples, and the example embodiments are not limited thereto.

Figure 19:
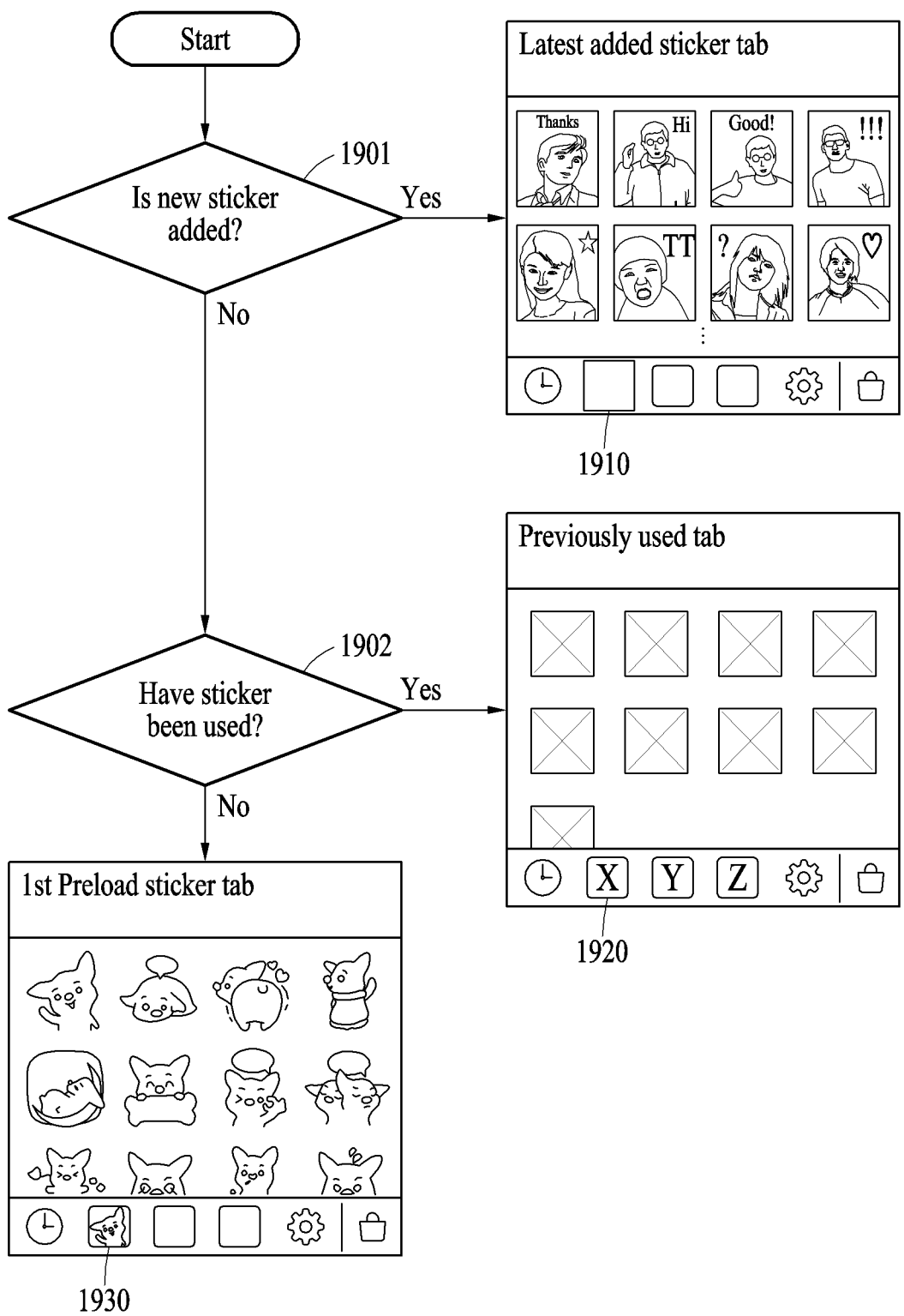
FIG. 19 is a diagram illustrating a display order of sticker packages according to certain embodiments.

FIG. 19 is a diagram illustrating a display order of sticker packages according to certain embodiments.

In operation 1901, an electronic device (e.g., the electronic device 101 of FIG. 1) may determine whether a new sticker is added. If the new sticker is determined to be added, the electronic device may display a badge indicator on a graphic representation 1910 corresponding to a newly added sticker package in a sticker tray. If the newly added sticker package is selected, the electronic device may remove the badge indicator from the graphic representation 1910. The electronic device may preferentially display a tab indicating a last sticker package added to the sticker tray, for example, in a leftmost area of the sticker tray.

In operation 1902, the electronic device may determine whether a sticker has been used, when there is no newly added sticker. If the sticker has been used, the electronic device may provide a tab 1920 indicating the most recently used sticker to the sticker tray. If the sticker has not been used, the electronic device may provide a sticker package 1930 among installed sticker packages to the sticker tray.

For reference, an example in which a display form factor is a flat display is mainly described herein, however, the example embodiments are not limited thereto. The electronic device may adjust a position, a size, and a shape for visualizing a sticker, a sticker package, and/or a sticker tray according to the display form factor. For example, if the electronic device includes a foldable display and/or a rollable display, the electronic device may visualize the sticker, the sticker package, and/or the sticker tray with an increased size in an expanded display state (e.g., a state in which the foldable display is unfolded and a state in which the rollable display is unrolled), and may display an increased number of stickers on a single screen. In another example, if the display state is switched (e.g., switched from a folded state to an unfolded state and switched from a rolled state to an unrolled state), the electronic device may increase the size of the sticker, the sticker package, and/or the sticker tray visualized on a display, or increase a number of times the sticker, the sticker package, and/or the sticker tray are visualized.

Figure 20:
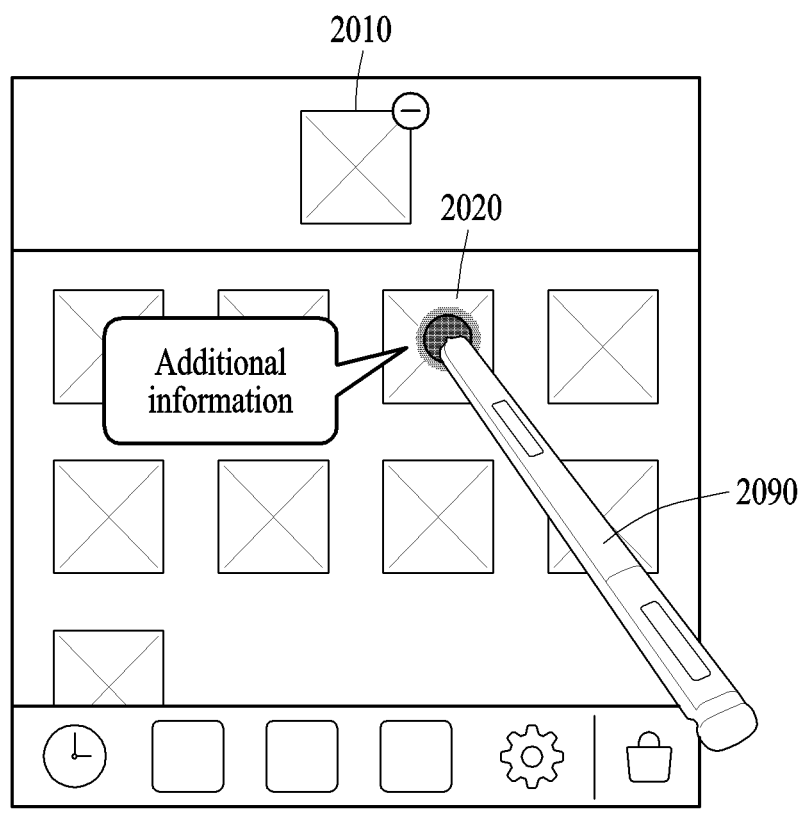
FIG. 20 is a diagram illustrating an example of providing additional information of a sticker according to certain embodiments.

FIG. 20 is a diagram illustrating an example of providing additional information of a sticker according to certain embodiments.

An electronic device according to an example embodiment may display additional information 2020 including any one or any combination of hashtag information, URL information, memo information, and position information associated with a sticker 2010, in response to detecting an additional manipulation of the sticker 2010. The additional manipulation may be a special input other than normal touches (e.g., a touch input to maintain a touch for a period of time less than or equal to a threshold time and then release the touch), and may include, for example, any one or any combination of a touch input of a stylus pen 2090, a hovering input, an air pointer, and an air gesture. The hovering input may be an input in which a tip of the stylus pen 2090 not being in contact with a display is spaced apart from the display within a threshold distance. The air pointer and the air gesture may indicate an input and a gesture pointing in the air spaced apart from the electronic device.

The electronic device may provide the additional information 2020 of the sticker 2010 pointed to by the additional manipulation as a pop-up message. The additional information 2020 may include tag information, a URL, a memo, a voice, a video, an image, and a position of the sticker 2010. The electronic device may provide, as the additional information 2020, a portion of second content, or remaining description information that is not mapped to the second content among description information of the sticker 2010 as additional information 2020.

According to certain embodiments, an electronic device comprises: a display; a processor electrically connected to the display; and a memory electrically connected to the processor, wherein the processor is configured to perform a plurality of operations, the plurality of operations comprising: generating a sticker from first content in a first application; mapping second content to the sticker, thereby resulting in a mapped sticker; and in response to receiving text input to a second application from a virtual keyboard, the text input having a meaning related to the second content, providing the mapped sticker to the second application.

According to certain embodiments, mapping the second content to the generated sticker comprises: extracting description information associated with the sticker; presenting one or more candidate contents for the sticker based on the extracted description information; and mapping content, which is selected from the presented candidate contents based on at least one of a selection by a user input and an automatic selection, as the second content to the sticker.

According to certain embodiments, providing the mapped sticker to the application comprises: in response to the second content being included in prediction content for the text input, displaying the mapped sticker in a prediction area of the virtual keyboard; and in response selection of the sticker by the user, inputting the mapped sticker to the second application.

According to certain embodiments, providing the mapped sticker further comprises: displaying the mapped sticker and at least one other sticker in the prediction area of the virtual keyboard; and in response to a user selection of the mapped sticker, inputting the mapped sticker to the second application.

According to certain embodiments, displaying the mapped sticker and the at least one other sticker further comprises preferentially displaying a sticker belonging to a custom package installed by a user among a plurality of sticker packages in the prediction area of the virtual keyboard.

According to certain embodiments, the plurality of operations further comprise, in response to an additional manipulation of the sticker being detected, displaying additional information comprising any one or any combination of hashtag information, uniform resource locator (URL) information, memo information and position information associated with the sticker.

According to certain embodiments, the plurality of operations further comprises: obtaining the first content from content stored in an external device accessible by the electronic device.

According to certain embodiments, generating the sticker comprises: performing any one or any combination of cropping the first content, separating an object and a background in the first content, adding an auxiliary graphic representation to the first content, and dividing the first content into multi-layer images and converting each of multi-layer images to an image with a perceptional depth.

According to certain embodiments, the plurality of operations further comprises: generating a sticker package by grouping a plurality of stickers with any one or any combination of a name, a cover image, and creator information representing the plurality of stickers.

According to certain embodiments, the plurality operation further comprises in response to a sticker package to be installed being a same as a sticker package pre-installed on an electronic device, updating the pre-installed sticker package; and in response to the same sticker package as the sticker package to be installed not being found, newly installing a sticker package on the electronic device.

According to certain embodiments, a method comprises: generating a sticker from first content in a first application; mapping second content to the generated sticker, thereby resulting in a mapped sticker; and in response to receiving text input to a second application from a virtual keyboard, the text input having a meaning related to the second content, providing the mapped sticker to the second application.

According to certain embodiments, mapping the second content comprises: extracting description information associated with the sticker; presenting one or more candidate contents for the sticker based on the extracted description information; and mapping content, which is selected from the presented candidate contents based on at least one of a selection by a user input and an automatic selection, as the second content to the sticker.

According to certain embodiments, providing of the mapped sticker comprises: in response to the second content being included in prediction content for the text input, displaying the mapped sticker in a prediction area of the virtual keyboard; and in response to selection by the user, inputting the mapped sticker to the second application.

According to certain embodiments, providing of the sticker comprises: is playing the mapped sticker and at least one other sticker in the prediction area of the virtual keyboard; and in response to a user selection of the mapped sticker, inputting the mapped sticker to the second application.

According to certain embodiments, displaying the mapped sticker and the at least one other sticker further comprises preferentially displaying a sticker belonging to a custom package installed by a user among a plurality of sticker packages in the prediction area of the virtual keyboard.

According to certain embodiments, the method further comprises: in response to an additional manipulation of the sticker being detected, displaying additional information comprising any one or any combination of hashtag information, uniform resource locator (URL) information, memo information and position information associated with the sticker.

According to certain embodiments, generating of the sticker comprises obtaining the first content from content stored an external device accessible by the electronic device.

According to certain embodiments, generating of the sticker comprises performing any one or any combination of cropping the first content, separating an object and a background in the first content, adding an auxiliary graphic representation to the first content, and dividing the first content into multi-layer images and converting each of multi-layer images to an image with a perceptional depth.

According to certain embodiments, generating of the sticker comprises generating a sticker package by grouping a plurality of stickers with any one or any combination of a name, a cover image, and creator information representing the plurality of stickers.

According to certain embodiments, a non-transitory computer-readable storage medium stores instructions that, when executed by a processor, cause the processor to perform any of the aforementioned methods described herein.

Although the disclosure has been described with reference to various embodiments as an example, it should be understood that the various embodiments are intended to be exemplary and are not limiting the disclosure. It will be apparent to those skilled in the art that various changes can be made in form and detail without departing from the overall scope of the disclosure, including the appended claims and equivalents to the same.

What is claimed is:
1. An electronic device comprising:
 a display;
 a processor electrically connected to the display; and
 a memory electrically connected to the processor,
 wherein the processor is configured to perform a plurality of operations, the plurality of operations comprising:
  generating a plurality of stickers from a respective plurality of first content in a first application;
  mapping a respective plurality of second content to the plurality of stickers, thereby resulting in a plurality of mapped stickers, wherein the second content is provided by user input;
  storing the plurality of mapped stickers in the memory; and
  in response to receiving text input to a second application from a virtual keyboard, retrieving from the memory and providing selected ones of the plurality of mapped stickers with second content related to a connotation of the text input to the second application.

2. The electronic device of claim 1, wherein mapping the respective plurality of second content to the plurality of stickers comprises:
   extracting description information associated with the plurality of stickers, thereby resulting in extracted description information;
   presenting one or more candidate contents for the plurality of stickers based on the extracted description information, thereby resulting in presented candidate contents; and
   mapping content, which is selected from the presented candidate contents by the user input, as the second content to the sticker.

3. The electronic device of claim 1, wherein providing the selected ones of the plurality of mapped stickers to the second application comprises:
   in response to the second content of the selected ones of the plurality of mapped stickers being included in prediction content for the text input, displaying the selected ones of the plurality of mapped stickers in a prediction area of the virtual keyboard; and
   in response selection of one of the selected ones of the plurality of mapped stickers by a user, inputting the one of the selected ones of the plurality of mapped stickers to the second application.

4. The electronic device of claim 1, wherein providing the selected ones of the plurality of mapped stickers further comprises:
   displaying the selected ones of the plurality of mapped stickers in a prediction area of the virtual keyboard; and
   in response to a user selection of the one of the selected ones of the plurality of mapped stickers, inputting the one of the selected ones of the plurality of mapped stickers to the second application.

5. The electronic device of claim 4, wherein displaying the selected ones of the plurality of mapped stickers further comprises preferentially displaying a one of the plurality of stickers belonging to a custom package installed by a user among a plurality of sticker packages in the prediction area of the virtual keyboard.

6. The electronic device of claim 1, wherein the plurality of operations further comprise, in response to an additional manipulation of the one of the plurality of stickers being detected, displaying additional information comprising any one or any combination of hashtag information, uniform resource locator (URL) information, memo information and position information associated with the plurality of stickers.

7. The electronic device of claim 1, wherein the plurality of operations further comprises:
   obtaining the plurality of first content from content stored in an external device accessible by the electronic device.

8. The electronic device of claim 1, wherein generating the plurality of stickers comprises:
   performing any one or any combination of cropping the plurality of first content, separating objects and backgrounds in the plurality of first content, adding auxiliary graphic representation to the plurality of first content, and dividing the plurality of first content into multi-layer images and converting each of multi-layer images to an image with a perceptional depth.

9. The electronic device of claim 1, wherein the plurality of operations further comprises:
   generating a sticker package by grouping the plurality of stickers with any one or any combination of a name, a cover image, and creator information representing the plurality of stickers.

10. The electronic device of claim 1, wherein the plurality of operations further comprises:
    in response to a sticker package to be installed being a same as a pre-installed sticker package on an electronic device, updating the pre-installed sticker package; and
    in response to a same sticker package as the sticker package to be installed not being found, newly installing a sticker package on the electronic device.

11. A method implemented by a processor, the method comprising:
    generating a plurality of stickers from a respective plurality of first content in a first application;
    mapping a respectively plurality of second content to the plurality of stickers, thereby resulting in a plurality of mapped stickers, wherein the second content is provided by user input;
    storing the plurality of mapped stickers in a memory; and
    in response to receiving text input to a second application from a virtual keyboard, retrieving from the memory and providing selected ones of the plurality of mapped stickers with second content related to a connotation of the text input to the second application.

12. The method of claim 11, wherein mapping the respective plurality of second content comprises:
    extracting description information associated with the plurality of stickers, thereby resulting in extracted description information;
    presenting one or more candidate contents for the plurality of stickers based on the extracted description information, thereby resulting in presented candidate contents; and
    mapping content, which is selected from the presented candidate contents by the user input, as the plurality of second content to the sticker.

13. The method of claim 11, wherein providing of the selected ones of the plurality of mapped stickers comprises:
    in response to the second content of the selected ones of the plurality of mapped stickers being included in prediction content for the text input, displaying the selected ones of the plurality of mapped stickers in a prediction area of the virtual keyboard; and
    in response to selection by a user, inputting one of the selected ones of the plurality of mapped stickers to the second application.

14. The method of claim 11, wherein providing of the selected ones of the plurality of mapped stickers comprises:
    displaying the selected ones of the plurality of mapped stickers in a prediction area of the virtual keyboard; and
    in response to a user selection of the one of the selected ones of the plurality of mapped stickers, inputting the one of the selected ones of the plurality of mapped stickers to the second application.

15. The method of claim 14, wherein displaying the selected ones of the plurality of mapped stickers further comprises preferentially displaying a one of the plurality of stickers belonging to a custom package installed by a user among a plurality of sticker packages in the prediction area of the virtual keyboard.

16. The method of claim 11, further comprising:
    in response to an additional manipulation of the one of the plurality of stickers being detected, displaying additional information comprising any one or any combination of hashtag information, uniform resource locator (URL) information, memo information and position information associated with the plurality of stickers.

17. The method of claim 11, wherein generating of the plurality of stickers comprises obtaining the plurality of first content from content stored an external device accessible by an electronic device.

18. The method of claim 11, wherein generating of the plurality of stickers comprises performing any one or any combination of cropping the plurality of first content, separating objects and backgrounds in the plurality of first content, adding auxiliary graphic representation to the plurality of first content, and dividing the plurality of first content into multi-layer images and converting each of multi-layer images to an image with a perceptional depth.

19. The method of claim 11, wherein generating of the plurality of stickers comprises generating a sticker package by grouping the plurality of stickers with any one or any combination of a name, a cover image, and creator information representing the plurality of stickers.

20. A non-transitory computer-readable storage medium storing instructions that, when executed by a processor, cause the processor to perform the method of claim 11.

* * * * *

UNITED STATES PATENT AND TRADEMARK OFFICE
CERTIFICATE OF CORRECTION

PATENT NO. : 12,124,696 B2
APPLICATION NO. : 17/830664
DATED : October 22, 2024
INVENTOR(S) : Chunbae Park et al.

Page 1 of 1

It is certified that error appears in the above-identified patent and that said Letters Patent is hereby corrected as shown below:

On the Title Page

Item (72) should read as follows:
Chunbae Park, Gyeonggi-do (KR);
Dami Jeon, Gyeonggi-do (KR);
Sangheon Kim, Gyeonggi-do (KR);
Jinhyung Yoo, Gyeonggi-do (KR);
Yeunwook Lim, Gyeonggi-do (KR);
Sangjeong Jo, Gyeonggi-do (KR)

Signed and Sealed this
Fifth Day of August, 2025

Coke Morgan Stewart
*Acting Director of the United States Patent and Trademark Office*